US008176782B2

(12) United States Patent
Furukubo et al.

(10) Patent No.: US 8,176,782 B2
(45) Date of Patent: May 15, 2012

(54) CAPACITIVE SENSOR

(75) Inventors: Eiichi Furukubo, Kadoma (JP);
Daisuke Wakabayashi, Osaka (JP);
Hisakazu Miyajima, Osaka (JP); Masao Ohbuchi, Kadoma (JP); Ryo Aoki, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 746 days.

(21) Appl. No.: 12/296,554

(22) PCT Filed: Apr. 25, 2007

(86) PCT No.: PCT/JP2007/058960
§ 371 (c)(1),
(2), (4) Date: Nov. 21, 2008

(87) PCT Pub. No.: WO2007/125961
PCT Pub. Date: Nov. 8, 2007

(65) Prior Publication Data
US 2009/0266164 A1    Oct. 29, 2009

(30) Foreign Application Priority Data

Apr. 28, 2006  (JP) ............................... P2006-126437
Apr. 28, 2006  (JP) ............................... P2006-126873

(51) Int. Cl.
*G01P 15/125* (2006.01)
(52) U.S. Cl. .................................................. 73/514.32
(58) Field of Classification Search ............... 73/514.32, 73/510, 504.12; 361/280
See application file for complete search history.

(56) References Cited

U.S. PATENT DOCUMENTS

| | | | |
|---|---|---|---|
| 4,483,194 A | 11/1984 | Rudolf | |
| 4,736,629 A | 4/1988 | Cole | |
| 5,016,072 A * | 5/1991 | Greiff | ........................ 257/418 |
| 5,220,835 A | 6/1993 | Stephan | |
| 5,488,862 A | 2/1996 | Neukermans et al. | |
| 5,629,790 A | 5/1997 | Neukermans et al. | |
| 5,731,520 A | 3/1998 | Stevenson et al. | |
| 5,900,550 A | 5/1999 | Menzel | |
| 5,905,203 A | 5/1999 | Flach et al. | |
| 6,000,287 A | 12/1999 | Menzel | |
| 6,044,705 A | 4/2000 | Neukermans et al. | |

(Continued)

FOREIGN PATENT DOCUMENTS

DE    197 50 350 C1    8/1999

(Continued)

OTHER PUBLICATIONS

Taiwan Office action, mail date is Oct. 27, 2010.

(Continued)

*Primary Examiner* — John Chapman, Jr.
(74) *Attorney, Agent, or Firm* — Greenblum & Bernstein, P.L.C.

(57) ABSTRACT

A capacitive sensor includes a fixed electrode and a movable electrode that is movably supported by an anchor portion through a beam portion. The fixed electrode and the movable electrode are opposed to each other with a gap interposed therebetween, thereby constituting a detecting unit. A capacitance suitable for a size of the gap is detected to detect a predetermined physical value. At least one of an end of the beam portion connected to the anchor portion and an end of the beam portion connected to the movable electrode is provided with a stress moderating unit that moderates a stress.

1 Claim, 19 Drawing Sheets

U.S. PATENT DOCUMENTS

| | | | |
|---|---|---|---|
| 6,082,197 | A | 7/2000 | Mizuno et al. |
| 6,426,013 | B1 | 7/2002 | Neukermans et al. |
| 6,467,345 | B1 | 10/2002 | Neukermans et al. |
| 6,520,017 | B1 | 2/2003 | Schoefthaler et al. |
| 6,725,719 | B2 * | 4/2004 | Cardarelli .................. 73/504.04 |
| 6,739,189 | B2 | 5/2004 | Lee et al. |
| 7,150,191 | B2 * | 12/2006 | Foote et al. ................. 73/514.29 |
| 2002/0158293 | A1 | 10/2002 | Lee et al. |
| 2004/0187578 | A1 | 9/2004 | Malametz et al. |
| 2005/0005698 | A1 | 1/2005 | McNeil et al. |
| 2005/0194652 | A1 | 9/2005 | Dutoit et al. |
| 2005/0268719 | A1 | 12/2005 | Malametz |

FOREIGN PATENT DOCUMENTS

| | | |
|---|---|---|
| DE | 19750350 | 8/1999 |
| DE | 199 38 206 A1 | 2/2001 |
| DE | 102 27 662 A1 | 1/2004 |
| JP | 58-10661 | 1/1982 |
| JP | 62-3630 | 1/1987 |
| JP | 5-502945 | 5/1993 |
| JP | 5-333052 | 12/1993 |
| JP | 6-213923 | 8/1994 |
| JP | 8-178952 | 7/1996 |
| JP | 9-189716 | 7/1997 |
| JP | 9-512904 | 12/1997 |
| JP | 11-33751 | 2/1999 |
| JP | 11-515092 | 12/1999 |
| JP | 2000-28634 | 1/2000 |
| JP | 2003-14778 | 1/2003 |
| JP | 2003-509670 | 3/2003 |
| JP | 2003-510591 | 3/2003 |
| KR | 2002-0083407 | 11/2002 |
| WO | 91/14285 | 9/1991 |
| WO | WO95/24652 | 9/1995 |
| WO | 97/04283 | 2/1997 |
| WO | 01/20259 | 3/2001 |
| WO | 01/23837 | 4/2001 |
| WO | 2004/088330 | 10/2004 |

OTHER PUBLICATIONS

English language Abstract of JP 2000-28634.
English language Abstract of JP 9-189716.
English language Abstract of JP 2003-14778.
English language Abstract of JP 8-178952.
English language Abstract of JP 9-512904.
English language Abstract of JP 5-502945, May 20, 1993.
English language Abstract of JP 11-33751, Feb. 9, 1999.
Korea Office action, dated Aug. 2010 along with an english translation thereof.
China Office action, dated Jun. 2, 2011 in Chinese Application No. 200780015491.5 along with an english translation thereof.
Extended European Search Report that issued in PCT Application No. PCT/JP2007/058960 on Oct. 5, 2011.

* cited by examiner (a)

(b)

CAPACITIVE SENSOR

TECHNICAL FIELD

The present invention relates to a capacitive sensor that detects a predetermined physical value by detecting a capacitance between a fixed electrode and a movable electrode.

BACKGROUND ART

Conventionally, there has been a capacitive sensor in which a structure having a movable electrode supported by a fixed portion through an elastic element is formed, the movable electrode can move toward and away from the fixed electrode according to an external force, and a capacitance between these electrodes is detected, thereby detecting various physical values such as acceleration and angular speed (see Patent Document 1). As such a capacitive sensor, there is also a known capacitive sensor capable of detecting a physical value in a vertical axis direction by one mass portion that is displaced by a physical value such as acceleration (see Patent Document 2 and Patent Document 3).

Patent Document 1: Japanese Patent Application Laid-open No. 2000-28634.
Patent Document 2: Specification of U.S. Pat. No. 4,736,629.
Patent Document 3: Specification of U.S. Pat. No. 6,000,287.

According to the capacitive sensor of Patent Document 1, the elastic element is formed as a beam that is spirally extending from a fixed portion, and a movable electrode that is movably supported by the fixed portion through the elastic element is displaced mainly in a direction extending along a surface of a sensor (semiconductor layer). According to a capacitive sensor of each of Patent Documents 2 and 3, an asymmetrical mass portion is supported by a torsion beam that extends from a fixed portion called an anchor portion in a horizontal direction symmetrically such that mass balance is lost, and a physical value can be detected by a positional displacement of the mass portion caused by a torsion beam according to a physical value added in the vertical direction. According to Patent Document 2, such a capacitive sensor is formed by working a metal material. According to Patent Document 3, the capacitive sensor is formed by working a semiconductor substrate such as silicon using a known semiconductor process. When a device is formed by working silicon by a semiconductor process, since fine working can be carried out, it is possible to form a smaller and more precise capacitive sensor as compared with a case that a capacitive sensor is formed by working a metal material as in Patent Document 3.

In the case of a structure in which a movable electrode is movable supported by a fixed portion through a beam as in Patent Document 1, a stress generated in the beam is varied depending on a shape of the beam as the elastic element and the maximum acceleration applied to the sensor, but when a thin and long beam is provided when a sensor is made compact or a spring constant is set, a stress generated in the beam is prone to become great, and it becomes difficult to set a specification such as a displacement amount or a weight of the movable electrode to a desired value in some cases.

According to the capacitive sensor disclosed in Patent Document 3, since a single crystal silicon substrate is formed by crystal anisotropy etching, there is a problem that various portions such as an anchor portion are tapered, and a deficit or sticking of a member is generated by increase of device size or movement of a movable electrode. When the substrate is worked by the crystal anisotropy etching, there is problem that it is difficult to form a mass portion that enhances the detection sensitivity because the mass portion has a mass to some extent.

The present invention has been proposed in view of the above circumstances, and an object of the present invention is to reduce a stress of a beam, in a capacitive sensor having a movable electrode that is movably supported by a fixed portion through the beam. Another object of the present invention is to provide a capacitive sensor having a structure that can avoid a deficit or a sticking of a member generated by increase of device size or movement of a movable electrode.

DISCLOSURE OF INVENTION

A first aspect of the present invention provides a capacitive sensor comprising a fixed electrode and a movable electrode that is movably supported by a fixed portion of a semiconductor layer through a beam, in which the fixed electrode and the movable electrode are opposed to each other with a gap interposed therebetween, thereby constituting a detecting unit, a capacitance suitable for a size of the gap is detected, thereby detecting a predetermined physical value, wherein at least one of an end of the beam connected to the fixed portion and an end of the beam connected to the movable electrode is provided with a stress moderating unit that moderates a local stress concentration.

A second aspect of the present invention provides a capacitive sensor comprising a first detecting unit that is movably supported by a fixed portion of a semiconductor layer through a beam portion such that asymmetric weight balance is kept, in which a first movable electrode that moves according to displacement of a physical value in a thickness direction of the semiconductor layer and a first fixed electrode formed on a support substrate that supports the semiconductor layer are opposed to each other with a gap interposed therebetween, and the first detecting unit detects the physical value based on a capacitance detected according to the sizes of the first movable electrode and the first fixed electrode, the semiconductor layer is a single crystal silicon layer, and the capacitive sensor includes a movable mechanism of the first movable electrode comprising the fixed portion, the beam portion and the first movable electrode formed by vertically etching the single crystal silicon layer.

According to the capacitive sensor of the first aspect of the present invention, a portion where a stress is prone to become large in the beam, i.e., at least one of the end connected to the fixed portion of the beam and the end of the beam connected to the movable electrode is provided with the stress moderating unit that moderates a stress. Therefore, a stress generated in the beam can be reduced.

According to the capacitive sensor of the second aspect of the present invention, it is possible to enhance the detection sensitivity, and a deficit or a sticking of a member generated by increase of device size or movement of a movable electrode can be avoided. By forming the movable mechanism by the vertical etching process, a uniform cross section shape can be obtained and thus, it is possible to largely reduce the sensitivity of the other axis. Further, since the semiconductor layer is the single crystal silicon, there is not film stress, and it is easy to work.

BEST MODE FOR CARRYING OUT THE INVENTION

Embodiments of the present invention will be explained below in detail with reference to the drawings.

First Embodiment

Figure 2:
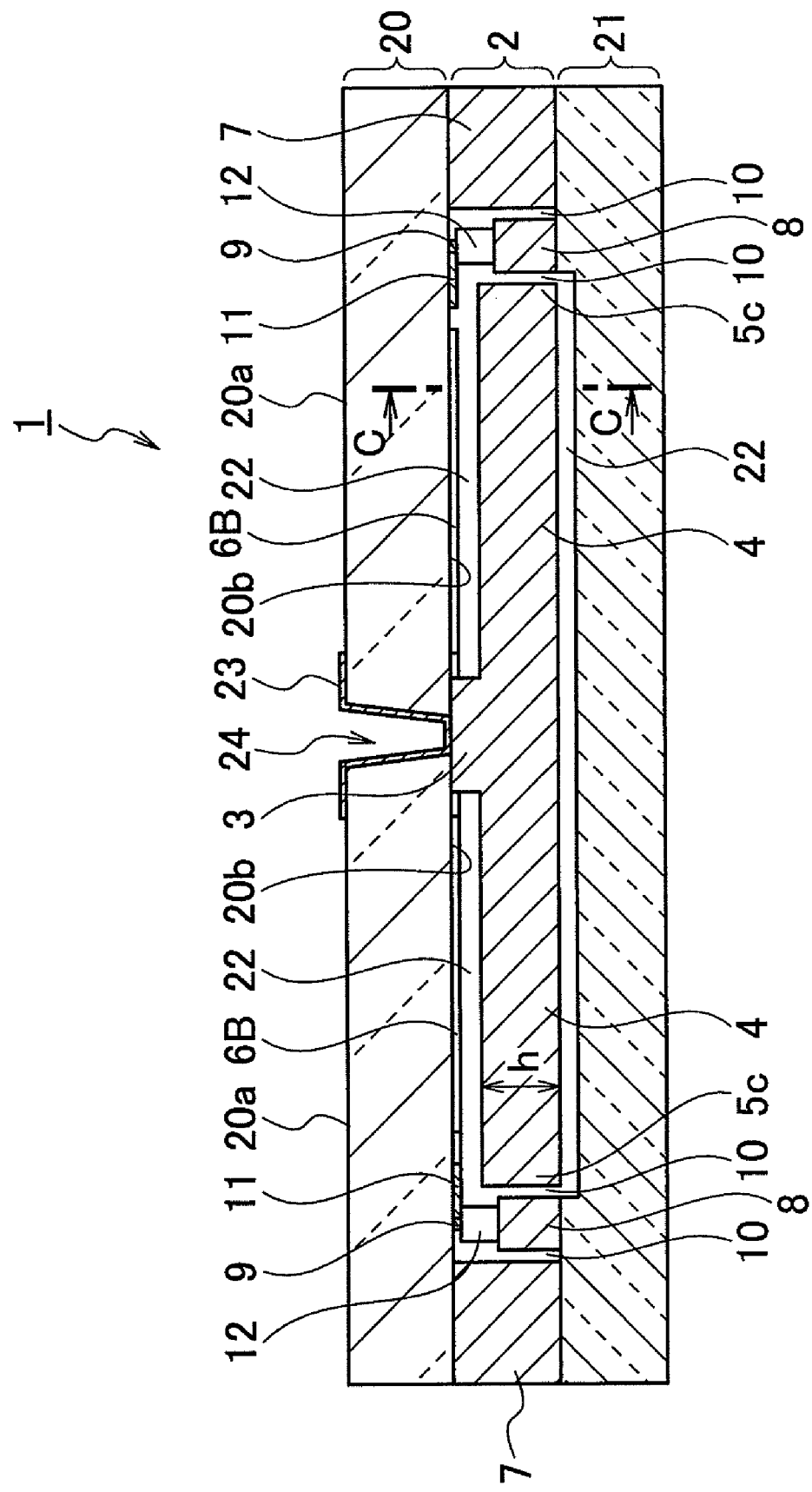
FIG. 2 is a sectional view of the capacitive sensor taken along the line A-A in FIG. 1.

As shown in FIG. 2, a capacitive sensor 1 (hereinafter, simply sensor 1) as a first embodiment of the present invention has a semiconductor layer 2 obtained by processing a semiconductor substrate, and insulation layers 20 and 21 such as glass substrates are bonded on both front and back sides by anodic bonding. Relatively shallow recesses 22 are formed in bonded surfaces between the semiconductor layer 2 and the insulation layers 20 and 21, insulation properties of the semiconductor layer 2 and moving easiness of the movable electrode 5 are secured. In the present embodiment, the bonded surface between the semiconductor layer 2 and the insulation layer 20 is provided with the recess 22 on the side of the semiconductor layer 2, and the bonded surface between the semiconductor layer 2 and the semiconductor layer 2 is provided with the recess 22 on the side of the insulation layer 21.

A conductive layer 23 is formed on a surface 20a of the insulation layer 20, and the conductive layer 23 is used as an electrode for obtaining potential of various portions of the semiconductor layer 2. In the present embodiment, the insulation layer 20 is sandblasted and formed with a through hole 24, a portion of a surface of the semiconductor layer 2 (surface of the semiconductor layer 2 on the side of the insulation layer 20) is exposed, a continuous conductive layer 23 is formed such as to electrically connecting the surface of the insulation layer 20 and an inner peripheral surface of the through hole 24 and the surface of the semiconductor layer 2 (surface of the anchor portion 3 in FIG. 2) so that potential of each portion in the semiconductor layer 2 can be detected from the conductive layer 23. It is preferable that the surface of the insulation layer 20 is coated (molding) with resin layer (not shown).

Figure 1:
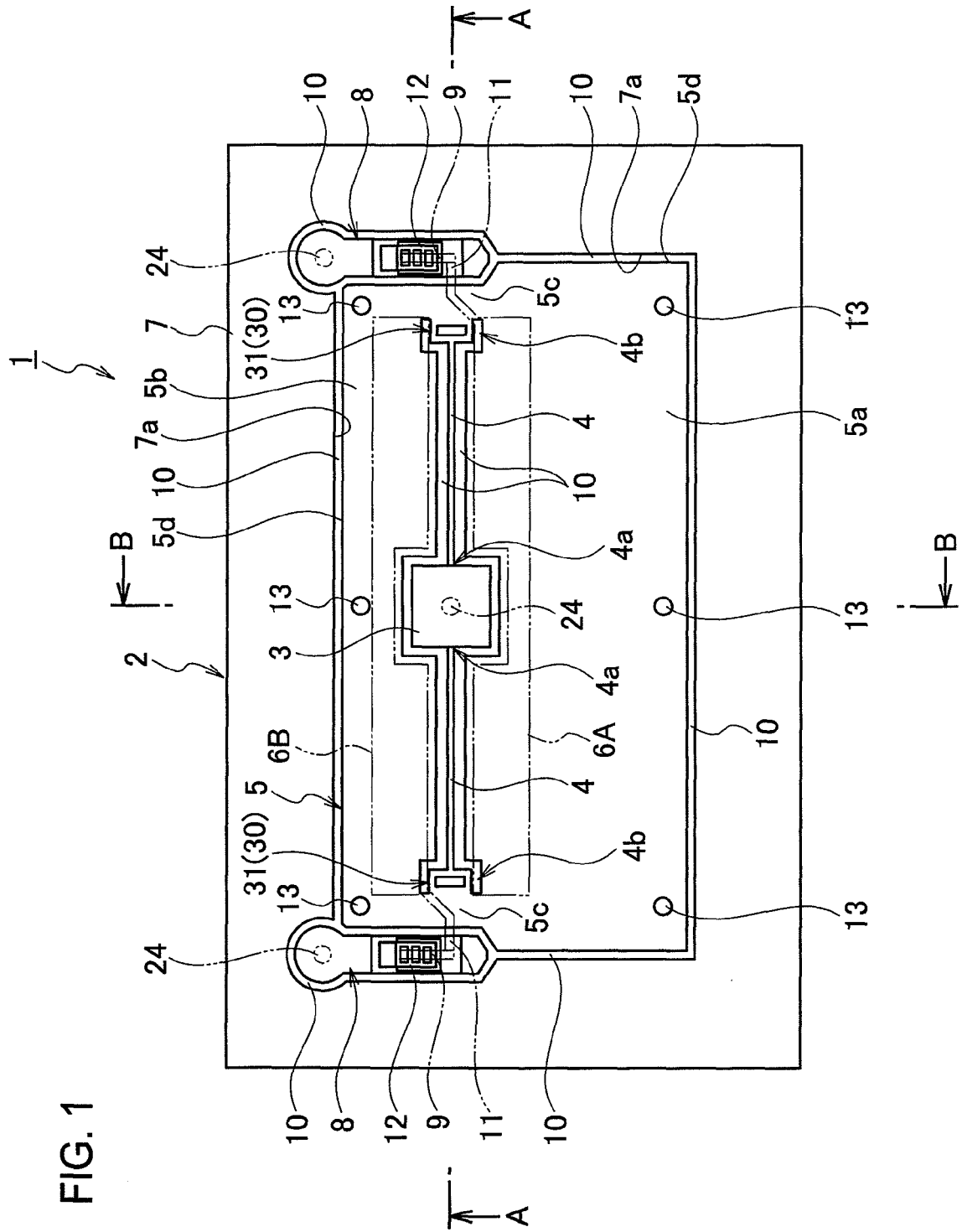
FIG. 1 is a plan view of a semiconductor layer of a capacitive sensor according to an embodiment of the present invention.
Figure 3:
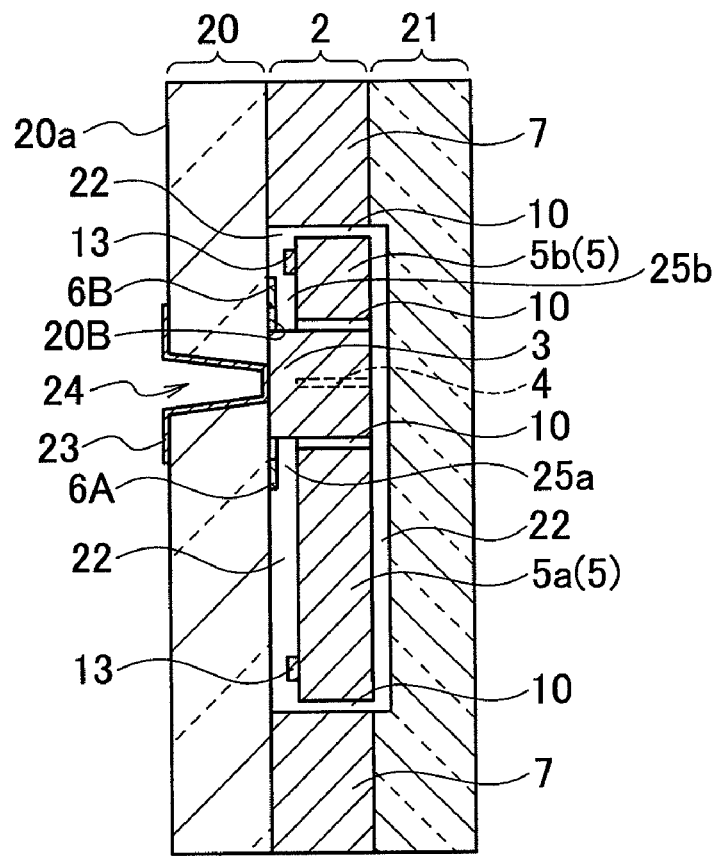
FIG. 3 is a sectional view of the capacitive sensor taken along the line B-B in FIG. 1.

As shown in FIGS. 1 to 3, the semiconductor substrate is formed with a gap 10 by a known semiconductor process, thereby forming the anchor portion 3, a beam portion 4, the movable electrode 5, a frame portion 7 and a potential taking-out portion B on the semiconductor layer 2. As shown in FIG. 1, the semiconductor layer 2 is formed into substantially a rectangular shape as a whole as viewed from above, and the frame portion 7 is provided in a form of a frame with substantially a constant width along four peripheral edges (four sides) of the semiconductor layer 2.

The gap 10 is vertically etched by reactive ion etching (RIE) such that sidewall surfaces of the gap 10 are perpendicular to the surface of the semiconductor layer 2. The sidewall surfaces of the gap 10 formed by vertically etching in this manner are opposed to each other substantially in parallel.

As the reactive ion etching, it is possible to utilize ICP working by an etching device having inductively coupled plasma (ICP) for example. Since each of a large plate portion 5a and a small plate portion 5b is formed out of one single crystal silicon substrate, a mass of the large plate portion 5a that is greater than the small plate portion 5b in size is high.

The columnar anchor portion 3 having a rectangular cross section (substantially square cross section in the present embodiment) is provided inside the frame portion 7 at a location slightly deviated from the center of the semiconductor layer 2 as viewed from above toward one long side (upper side in FIG. 1) of the frame portion 7. The beam portions 4 and 4 extend substantially in parallel from a pair of sidewalls of the anchor portion 3 opposed to the short side of the frame portion 7. Although the anchor portion 3 abuts (is bonded to) only against the insulation layer 20 in the present embodiment as shown in FIGS. 2 and 3, the anchor portion 3 can further abut (is bonded to) against the insulation layer 21.

Figure 4:
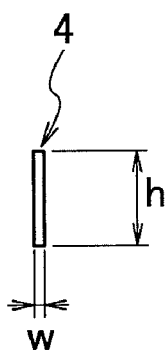
FIG. 4 is a sectional view of a beam portion of the capacitive sensor (taken along the line C-C in FIG. 2) according to the embodiment of the present invention.

The beam portion 4 is formed as a beam having a constant rectangular (substantially rectangular) cross section as shown in FIG. 4. The height h of the semiconductor layer 2 in its thickness direction is 10 micrometers or more (500 micrometers or less), and the width W of the semiconductor layer 2 in a direction along the surface thereof is several micrometers (about 3 to 10 micrometers) for example although these values can be varied depending on the entire size. The beam portion 4 has a constant cross section and extends in a direction along the long side of the frame portion 7. An end of the beam portion 4 opposite from an end 4a thereof on the side of the anchor portion 3 is connected to the movable electrode 5.

The movable electrode 5 has a substantially rectangular outer peripheral surface 5d as viewed from above. The outer peripheral surface 5d is opposed to an inner peripheral surface 7a of the frame portion 7 with the gap 10 therebetween. The movable electrode 5 is formed such as to surround outer sides of the anchor portion 3 and the beam portions 4 and 4 with the gap 10. As shown in FIG. 1, the movable electrode 5 has the substantially rectangular large plate portion 5a on the side of the long side of the frame portion 7 (lower side in FIG. 1) with the gap 10, and the movable electrode 5 has the substantially rectangular small plate portion 5b on the side of the other long side (upper side in FIG. 1) of the frame portion 7 with the gap 10. The large plate portion 5a and the small plate portion 5b are connected to each other through a pair of connections 5C and 5C extending along the short side of the frame portion 7. The beam portions 4 and 4 are connected to substantially central portions of the corresponding connections 5C and 5C, respectively. With the above structure, since each of the large plate portion 5a and small plate portion 5b is formed out of one single crystal silicon substrate, a mass of the large plate portion 5a having greater size than that of the small plate portion 5b is high.

The movable electrode 5 is movably supported by the anchor portion 3 as the fixed portion of the sensor 1 through the beam portions 4 and 4 with asymmetric mass balance. This structure can be obtained by forming the semiconductor layer 2 with the gap 10 and forming at least one of the insulation layers 20 and 21 with the recess 22. The anchor portion 3, the beam portions 4 and 4, and the movable electrode 5 are integrally formed as a portion of the semiconductor layer 2. Potentials of the anchor portion 3, the beam portions 4 and 4 and the movable electrode 5 can be regarded as being substantially equal to each other.

The beam portions 4 and 4 function as spring elements that elastically and movably support the movable electrode 5 with respect to the frame portion 7. In the present embodiment, the beam portions 4 and 4 have cross sections which are long in the thickness direction of the sensor 1 (cross sections perpendicular to the extending axis of the beam portion 4) as shown in FIG. 4, the beam portion 4 is not bent easily in the thickness direction. The movable electrode 5 includes the large plate portion 5a and the small plate portion 5b that are opposed to each other with the beam portions 4 and 4 interposed therebetween and that have different masses. Masses on the both sides of the beam portions 4 and 4 are different from each other. Therefore, if acceleration is generated in the sensor 1 in the thickness direction, the beam portions 4 and 4 are twisted by a difference in inertia applied to the large plate portion 5a and the small plate portion 5b, and the movable electrode 5 rocks around the beam portions 4 and 4. That is, in the present embodiment, the beam portions 4 and 4 function as beams (torsion beams).

In the present embodiment, the insulation layer 20 is provided at its lower surface 20b with fixed electrodes 6A and 6B such as to be opposed to the large plate portion 5a and the small plate portion 5b of the movable electrode 5, respectively. A capacitance between the large plate portion 5a and the fixed electrode 6A, and a capacitance between the small plate portion 5b and the fixed electrode 6B are detected so that variations in these gaps and thus, variation in rocking attitude of the movable electrode 5 with respect to the fixed portion of the sensor 1 can be detected.

FIG. 5(a) shows a state that the movable electrode 5 does not rock and is in parallel to the lower surface 20b of the insulation layer 20. In this state, a size of a gap 25a between the large plate portion 5a and the fixed electrode 6A and a size of a gap 25b between the small plate portion 5b and the fixed electrode 6B are equal to each other. Therefore, an opposing area between the large plate portion 5a and the fixed electrode 6A, and an opposing area between the small plate portion 5b and the fixed electrode 6B are equal to each other, the capacitance between the large plate portion 5a and the fixed electrode 6A and the capacitance between the small plate portion 5b and the fixed electrode 6B are equal to each other.

FIG. 5(b) shows a state that the movable electrode 5 rocks and inclines with respect to the lower surface 20b of the insulation layer 20, the large plate portion 5a is separated from the fixed electrode 6A, and the small plate portion 5b approaches the fixed electrode 6B. In this state, as compared with the state shown in FIG. 5(a), the gap 25a becomes large and the gap 25b becomes small. Therefore, the capacitance between the large plate portion 5a and the fixed electrode 6A is reduced and the capacitance between the small plate portion 5b and the fixed electrode 6B is increased.

FIG. 5(c) shows a state that the movable electrode 5 rocks, the insulation layer 20 inclines with respect to the lower surface 20b, the large plate portion 5a approaches the fixed electrode 6A and the small plate portion 5b is separated from the fixed electrode 6B. In this state, as compared with the state shown in FIG. 5(a), the gap 25a becomes small and the gap 25b becomes large. Therefore, the capacitance between the large plate portion 5a and the fixed electrode 6A is increased and the capacitance between the small plate portion 5b and the fixed electrode 6B is reduced.

Therefore, it is possible to obtain voltage waveform obtained by C-V conversion and to detect various physical values (acceleration and angular acceleration) that is added to the sensor 1 from difference output between the capacitance in which the gap 25a between the large plate portion 5a and the fixed electrode 6A is a detection gap and the capacitance in which the gap 25b between the small plate portion 5b and the fixed electrode 6B is a detection gap.

These capacitances can be obtained from potentials of the movable electrode 5 and the fixed electrodes 6A and 6B. In the present embodiment, as shown in FIGS. 1 and 2, the through hole 24 is formed in the insulation layer 20 on the anchor portion 3, and potential of the movable electrode 5 is taken out through the conductive layer 23 formed on the inner surface of the through hole 24.

The fixed electrode 6 is formed as a substantially rectangular conductive layer (e.g., aluminum alloy layer) on the lower surface 20b of the insulation layer 20. In the forming step of the fixed electrode 6, a wiring pattern 11 and a terminal 9 are also formed at the same time as a conductive layer that is continuous from the fixed electrode 6. Therefore, the potential of the fixed electrode 6 is taken out through the wiring pattern 11, the terminal 9, the potential taking-out portion 8 formed on the semiconductor layer 2 and the conductive layer 23 formed on the insulation layer 20 on the potential taking-out portion 8.

A structure of the potential taking-out portion 8 will be explained with reference to FIG. 6. FIG. 6(a) is an enlarged view of the potential taking-out portion 8, FIG. 6(b) is a sectional view taken along the line C-C in FIG. 6(a), and FIG.

6(c) is a sectional view showing a state before the insulation layer 20 and the semiconductor layer 2 are bonded to each other.

The potential taking-out portion 8 is insulated from other portion of the semiconductor layer 2 such as the movable electrode 5 and the frame portion 7 by the gap 10 formed in the semiconductor layer 2 and the recess 22 formed in the semiconductor layer 2 or the insulation layer 21. The potential taking-out portion 8 includes a substantially columnar pad portion 8a and a thin and long pedestal 8b extending from the pad portion 8a along the short side of the frame portion 7. A recess 26 having a flat bottom surface 8C is formed in a portion of the pedestal 8b corresponding to the terminal 9. A mat layer 27 (e.g., silicon dioxide ($SiO_2$)) is formed on the bottom surface 8C, a conductive layer 28 having substantially the same height is formed at a location adjacent to the mat layer 27, and the contact portion 12 having a ladder shape as viewed from above is formed from the upper surface of the mat layer 27 to the upper surface of the conductive layer 28. Frame-like angle portions 12a are continuously formed on the contact portion 12. At that time, the conductive layer 28 and the contact portion 12 can be formed as a layer made of the same conductive material (e.g., aluminum alloy).

In the present embodiment, as shown in FIG. 6(c), each angle portion 12a of the contact portion 12 is formed such that it projects from the upper surface 2a of the semiconductor layer 2 by the height $\delta$. With this configuration, if the semiconductor layer 2 and the insulation layer 20 are bonded to each other, the terminal 9 presses the angle portion 12a to plastically deforms the angle portion 12a, thereby enhancing the intimate contact degree, and the angle portion 12a (contact portion 12) and the terminal 9 can come into contact with each other and conduction therebetween is established more reliably.

As shown in FIG. 1, stoppers 13 are provided on surfaces of the large plate portion 5a and the small plate portion 5b at appropriate locations so as to avoid a case that the movable electrode 5 and the fixed electrodes 6A and 6B come into direct contact with each other (collide) and they are damaged. If the stoppers 13 and the mat layer 27 are made of the same material in the same step, producing labor and producing cost can be reduced as compared with a case that they are formed separately.

Figure 7:
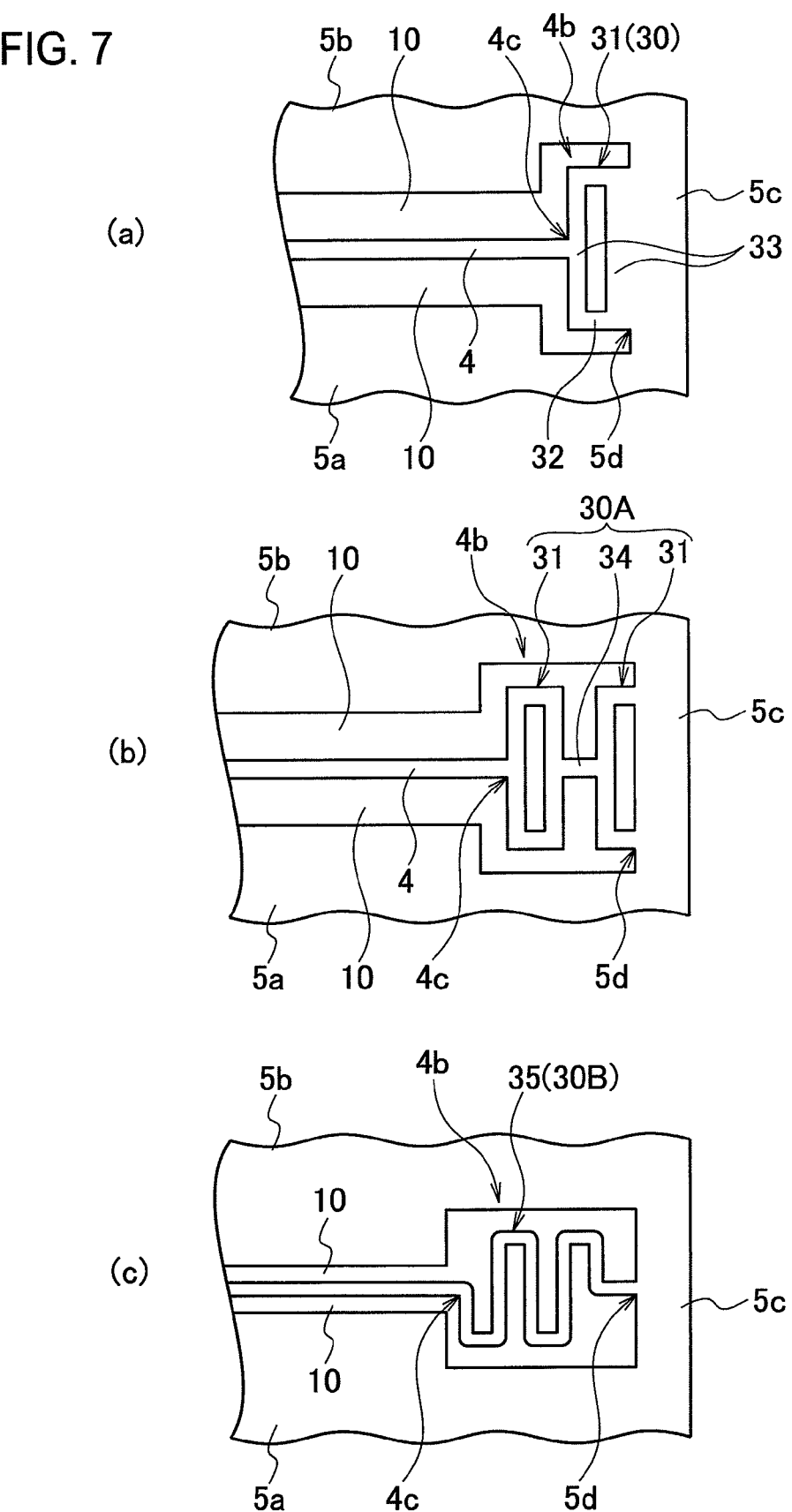
FIG. 7 are plan views (a) to (c) showing respective examples of a stress moderating unit of the capacitive sensor according to the embodiment of the present invention.

Next, stress moderating units 30, 30A, and 30B provided on ends of the beam portions 4 and 4 in the longitudinal direction will be explained with reference to FIG. 7.

FIG. 7(a) is a plan view of the stress moderating unit 30 according to the present embodiment. In this example, a frame structure 31 that is rectangular in shape as viewed from above is provided on an end on the side where the beam portion 4 is connected to a connection 5C of the movable electrode 5. More specifically, the thin and long frame structure 31 including a short side portion 32 formed along the extending direction of the beam portion 4 as viewed from above and a long side portion 33 extending in a direction intersecting with the extending direction at right angles is continuously provided on the connection 5C, and the end of the beam portion 4 is connected to a central portion of the frame structure 31 in its longitudinal direction. The end of the connection 5C is integrally formed on the long side portion 33, and the height of the frame structure 31 is the same as that of the beam portion 4. With this structure, a region which is bent as the movable electrode 5 moves can be increased as compared with a case that the beam portion 4 is directly connected to the connection 5C. Therefore, local concentration of stress at the corners (root portions) 4b and 5d can be moderated.

The frame structure 31 is formed thin and long in a direction perpendicular to the extending direction of the beam portion 4. Therefore, when the beam portion 4 is twisted around the extending axis thereof, a large bending margin can be taken at the long side portion 33 and this is effectively.

FIG. 7(b) is a plan view of the stress moderating unit 30A according to a modification of the present embodiment. In this example, frame structures 31 which are the same as that shown in FIG. 7(a) are disposed in a plurality of rows (two, in this example) in the extending direction of the beam portion 4, and the frame structures 31 and 31 are connected to each other through a connection piece 34 provided on the extension of the beam portion 4. In this example, since the frame structures 31 are provided in layers, stress can be moderated more effectively as compared with the example of FIG. 7(a).

FIG. 7(c) is a plan view of the stress moderating unit 30B according to another modification of the present embodiment. In this example, a meandering structure 35 in which the beam portion 4 is folded back a plurality of times with a predetermined width in a direction perpendicular to its extending direction. If the meandering structure 35 is provided, a region which is bent as the movable electrode 5 moves is increased as compared with a case that the beam portion 4 is directly connected to the connection 5C, local stress concentration at the corners (root portions) 4b and 5d can be moderated.

In any of the examples, the stress moderating units 30, 30A, and 30B are provided on the end 4b of the beam portion 4 on the side where it is connected to the movable electrode 5 (connection 5C of the movable electrode 5), but the stress moderating units 30, 30A, and 30B can be provided on the other end of the beam portion 4, i.e., the end 4a of the beam portion 4 on the side where it is connected to the anchor portion 3, and the same effect can be obtained in the end 4a. If the stress moderating units 30, 30A, and 30B are provided on both ends of the beam portion 4 in its longitudinal direction, a stress generated in the beam portion 4 can be further reduced. Different stress moderating units 30, 30A, and 30B can be provided on both ends, or a combination thereof can be formed.

According to the sensor 1 as the first embodiment of the present invention, as apparent from the above explanation, at least one of the end 4a of the beam portion 4 connected to the anchor portion 3 and the end 4b of the beam portion 4 connected to the movable electrode 5 is provided with the stress moderating unit 30, 30A, or 30B that moderates stress. Therefore, it is possible to reduce a stress generated in the beam portion 4, to enhance the durability, and to increase the setting flexible of specification such as a displacement amount and weight of the movable electrode 5. If the stress moderating units 30, 30A, and 30B are provided on both the end 4a of the beam portion 4 connected to the anchor portion 3 and the end 4b of the beam portion 4 connected to the movable electrode 5, a stress can be further reduced.

At this time, the stress moderating units 30, 30A, and 30B can be easily formed as one frame structure 31, a structure including frame structures 31 in many layers or the meandering structure 35. Particularly, when the beam portion 4 is used as a twisted beam, if the stress moderating units 30, 30A, and 30B are formed as one frame structure 31, the structure including the frame structures 31 in many layers or as the meandering structure 35 as exemplified in the present embodiment, a portion thereof intersecting with the axial direction at right angles can be made relatively long, a bending amount per unit length of the beam portion 4 (and stress moderating units 30, 30A, and 30B), and a stress can be reduced more effectively.

In the present embodiment, the cross section of the beam portion 4 is formed into a substantially rectangular shape. With this configuration, a direction in which the beam portion 4 is easily bent and a direction in which the beam portion 4 is not easily bent are defined, the movable electrode 5 is operated in a desired mode, and inconvenience caused by operation in an unwilling mode is suppressed. Particularly, when the movable electrode 5 rocks and beam portion 4 is formed as the twisted beam as in the present embodiment, the length (height h) of the sensor 1 in the thickness direction is set longer than the length (width W) of the sensor 1 in the direction extending along the surface of the sensor 1 on the cross section shape of the beam portion 4 perpendicular to the extending axis. With this configuration, the entire movable electrode 5 bends in the thickness direction (vertical direction in FIG. 2) of the sensor 1, both the large plate portion 5a and small plate portion 5b approach the fixed electrodes 6A and 6B, and deterioration of the detection precision can be suppressed.

Figure 8:
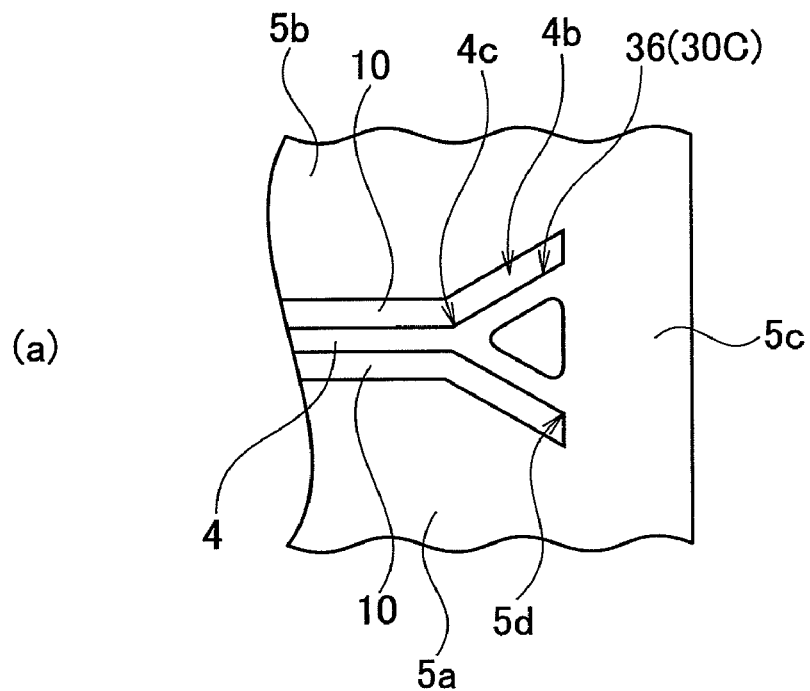
FIG. 8 are plan views (a) and (b) showing another example of the stress moderating unit of the capacitive sensor according to the embodiment of the present invention.
Figure 8:
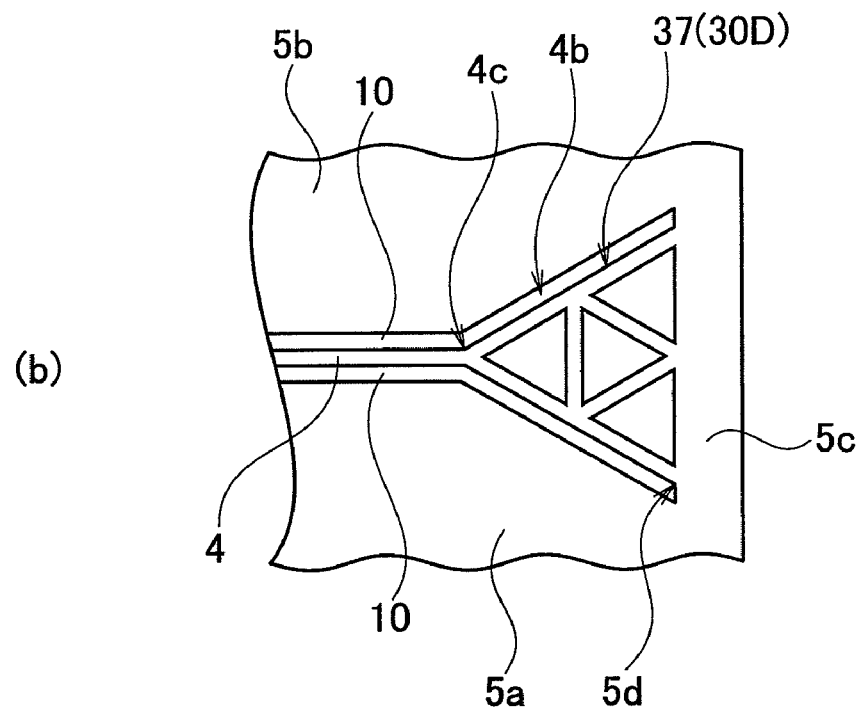

Although the beam is used as the twisted beam in the present embodiment, the present invention can be also applied to a case that the beam is used as a bent beam, and the present invention can be also applied to beams of various shapes such as spiral winding shape and a folded shape. The specifications of the frame structure and the meandering structure (e.g., the number of layers of the frame structure, the number of folding times of the meandering structure, sizes of various portions and shapes) can be variously deformed. The frame structure can be triangular in shape as viewed from above (e.g., regular triangular or isosceles triangular) as shown in FIG. 8(b), or a unit frame of the triangular shape can be superposed on each other in many layers in the form of truss. According to the structure, stress concentration can be further reduced as compared with the frame structure of rectangular shape as viewed from above.

Second Embodiment

Figure 9:
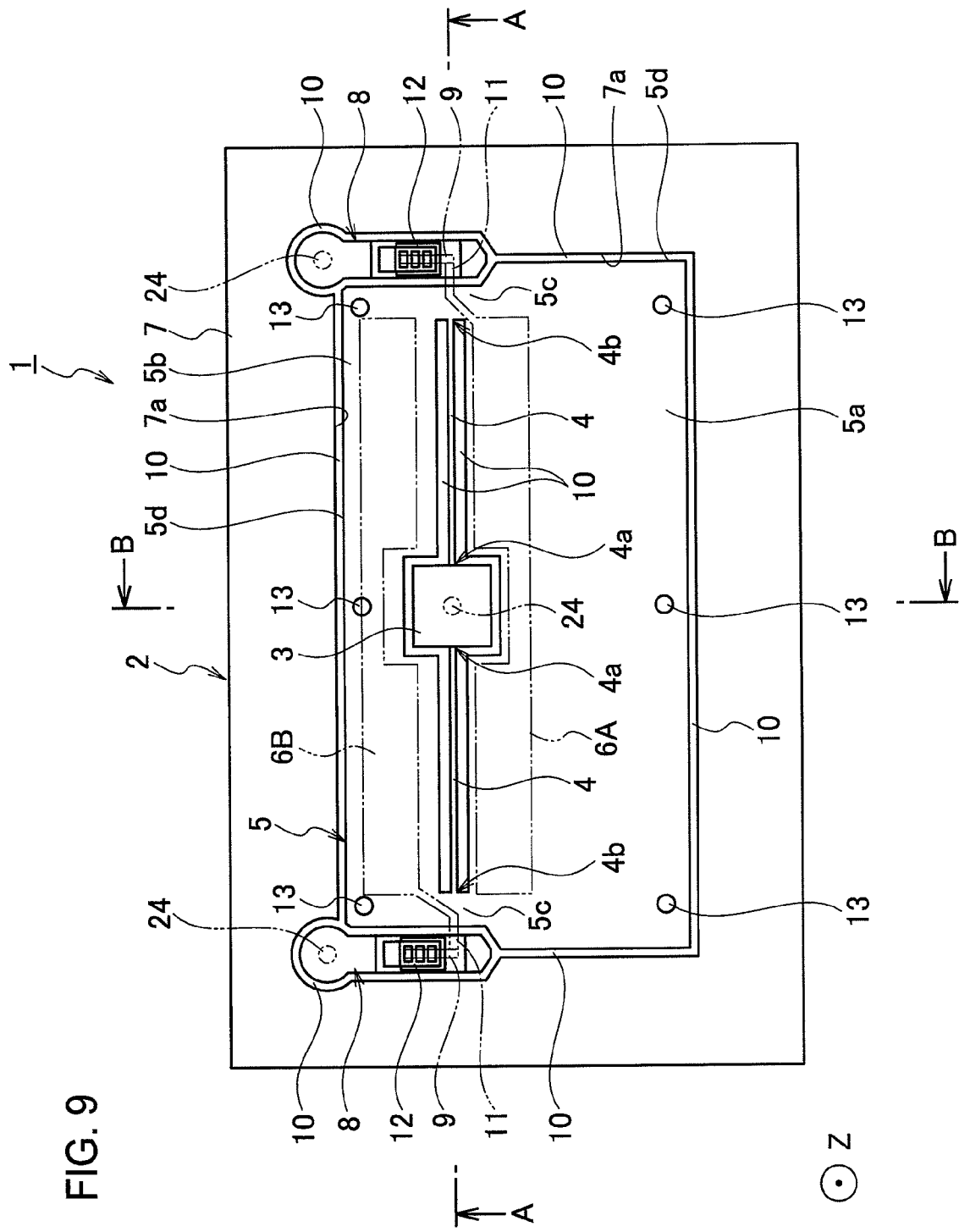
FIG. 9 is an explanatory diagram of a structure of a semiconductor layer of the capacitive sensor shown as a first embodiment of the present invention.
Figure 10:
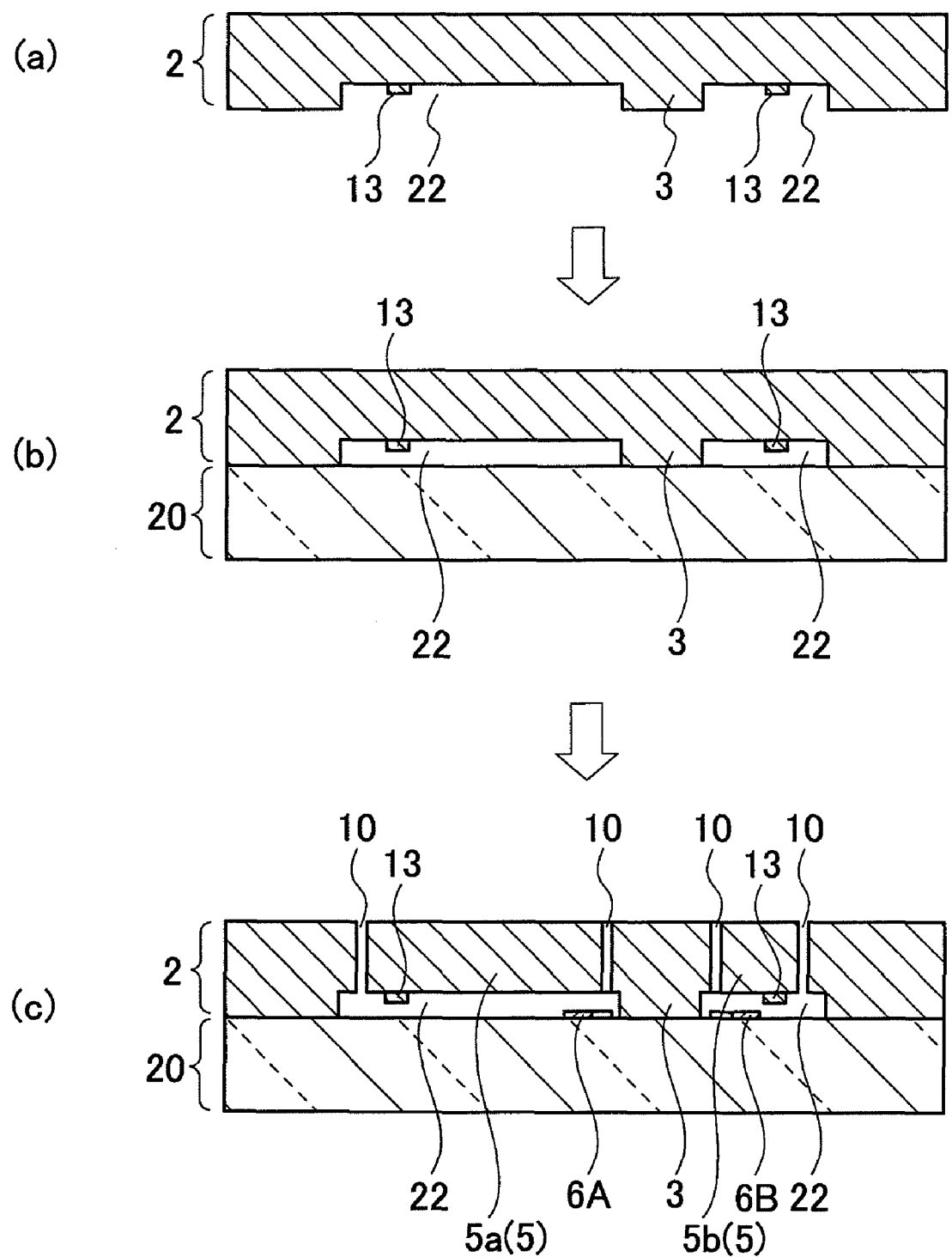
FIG. 10 are sectional views for explaining a recess formed in the semiconductor layer of the capacitive sensor.

The sensor 1 as a second embodiment of the present invention is different from the structure of the sensor 1 as the first embodiment in that ends of the beam portions 4 and 4 in the longitudinal direction are not provided with the stress moderating units 30 as shown in FIG. 9. In the second embodiment, as shown in FIG. 10(a), the semiconductor layer 2 is bonded to the insulation layer 20, and before the gap 10 is formed, the recess 22 is formed by various etching processes such as wet etching and dry etching. After cutting the semiconductor layer 2 away by the etching, the insulation layer 20 which is a glass substrate is bounded as shown in FIG. 10(b), vertical etching working is carried out, thereby forming the gap 10 as shown in FIG. 10(c). The stopper 13 is formed of oxide film or aluminum alloy after the recess 22 is formed by etching process.

By etching the semiconductor layer 2 which is the single crystal silicon substrate in this manner, the recess 22 is formed previously, and the surface on which the recess 22 is formed is opposed to the insulation layer 20 which becomes a support substrate and bonded thereto. With this configuration, etching residue produced by etching operation can be removed in an excellent manner, it is possible to prevent the sticking with the insulation layer 20 by rocking of the movable electrode 5, and also possible to enhance the quality of the sensor 1.

Since the semiconductor layer 2 is previously formed with the recess 22, an insulation substrate such as the glass substrate can be utilized as the insulation layer 20 which becomes the support substrate, it is possible to reduce the parasitic capacitance generated when a substrate made of silicon which is the same as the movable electrode 5 other than the insulation substrate is utilized.

Further, there is a merit that the recess 22 formed by etching can be easily formed only by forming a resist film pattern corresponding to the shape of the recess 22 and setting only etching time corresponding to the depth of the recess 22. Since the glass substrate can be utilized as the insulation layer 20, the twisting motion of the beam portion 4 by rocking of the movable electrode 5 made of single crystal silicon which becomes specular surface can be visually recognized as reflection of light and thus, the outward appearance can be easily inspected.

Figure 5:
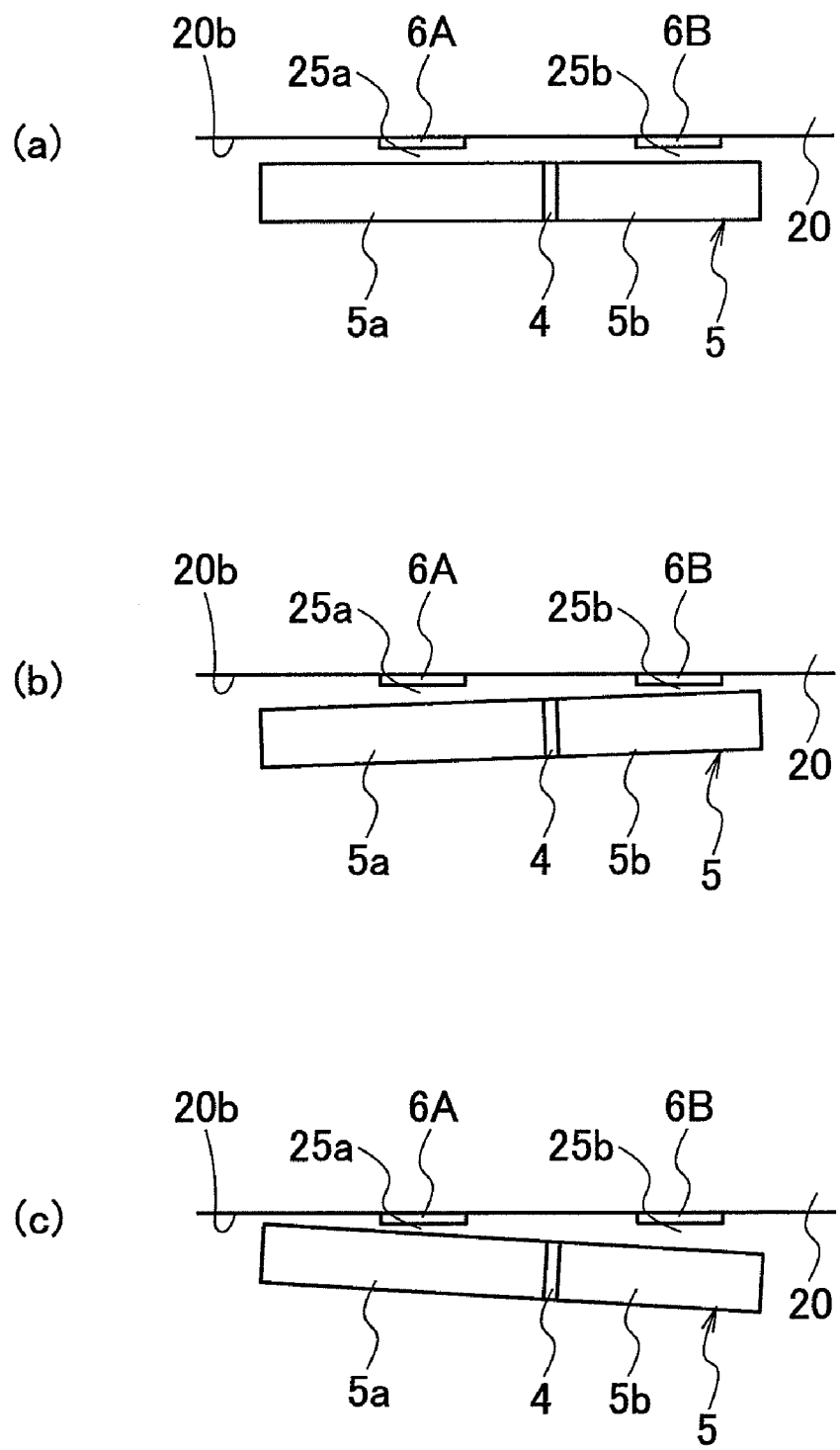
FIG. 5 are schematic diagrams showing a rocking movable electrode of the capacitive sensor according to the embodiment of the present invention, where (a) shows a state that the movable electrode does not rock, (b) shows a state that one side approaches a fixed electrode, and (c) shows a state that the other side approaches the fixed electrode.

The recess 22 defines a distance between detection gaps of the gap 25a between the large plate portion 5a and the fixed electrode 6A and the gap 25b between the small plate portion 5b and the fixed electrode 6B which are the detection gaps explained using FIG. 5. As is found from "$C=\epsilon S/d$" which is a basic equation of the capacitance C, where C represents a capacitance, S represents an opposing area, d represents a distance between detection gaps, and $\epsilon$ represents permittivity, it is necessary to precisely form the distance between the detection gaps. Generally, in the capacitive sensor formed by the semiconductor process, it is necessary that the distance between the detection gaps to prevent sticking during the producing process and the sticking at the time of actual use is 3 μm or more.

If the recess 22 is formed by crystal anisotropy etching utilizing the nature on which the etching speed depends in the crystal direction, the management of the etching process becomes easy. Therefore, it is possible to form the gaps 25a and 25b which become detection gaps of remarkably high precision with small variation.

Figure 11:
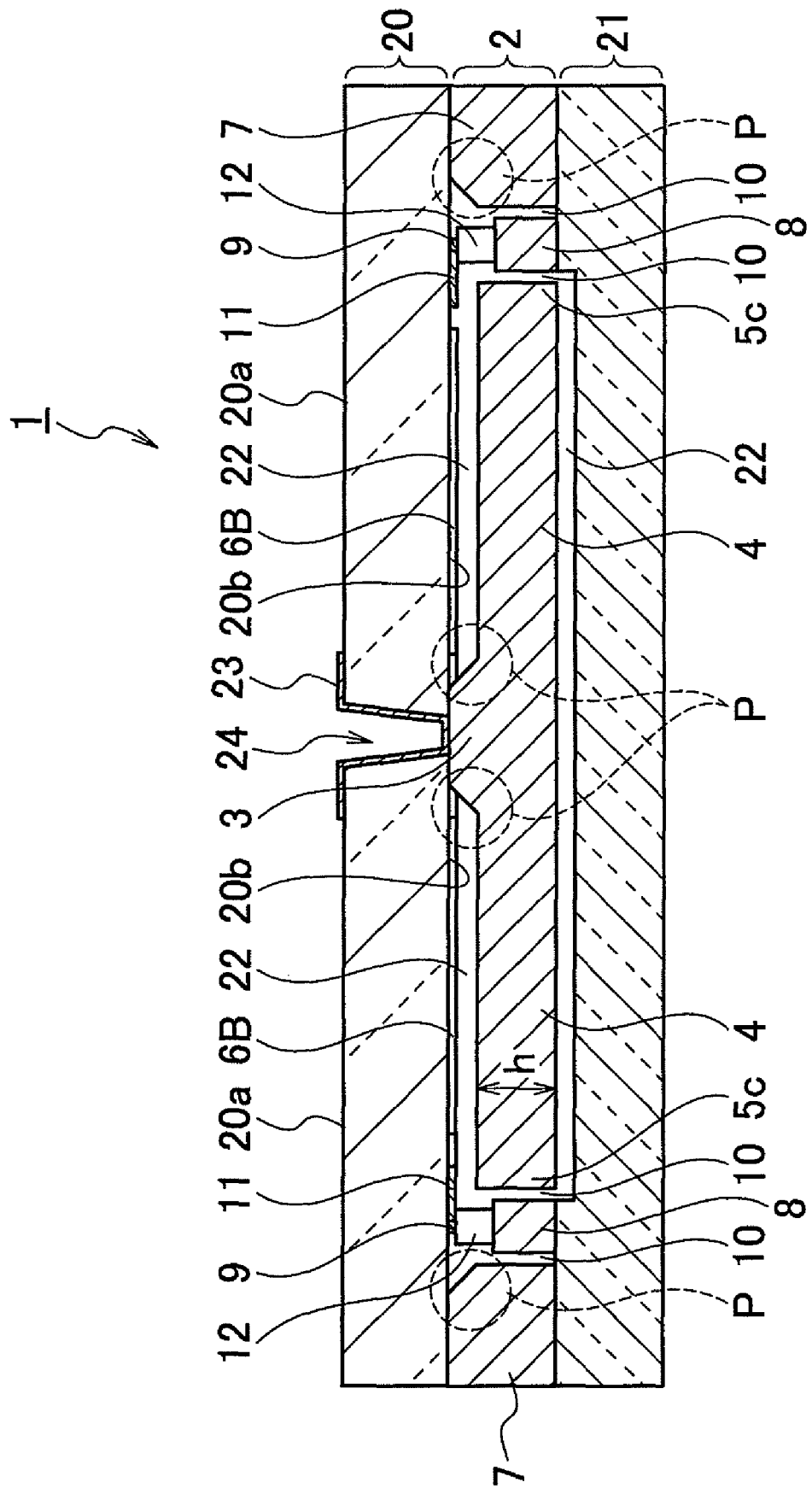
FIG. 11 is a sectional view showing a state that the recess in the semiconductor layer of the capacitive sensor is formed by crystal anisotropy etching.

FIG. 11 shows a state that the semiconductor layer 2 is cut from the line A-A in FIG. 9 when the recess 22 is formed by the crystal anisotropy etching. As shown in a region P in FIG. 11, planes of the anchor portion 3 and the frame portion 7 that become plane orientation of predetermined angles with respect to crystal plane of the cut single crystal silicon substrate.

Figure 6:
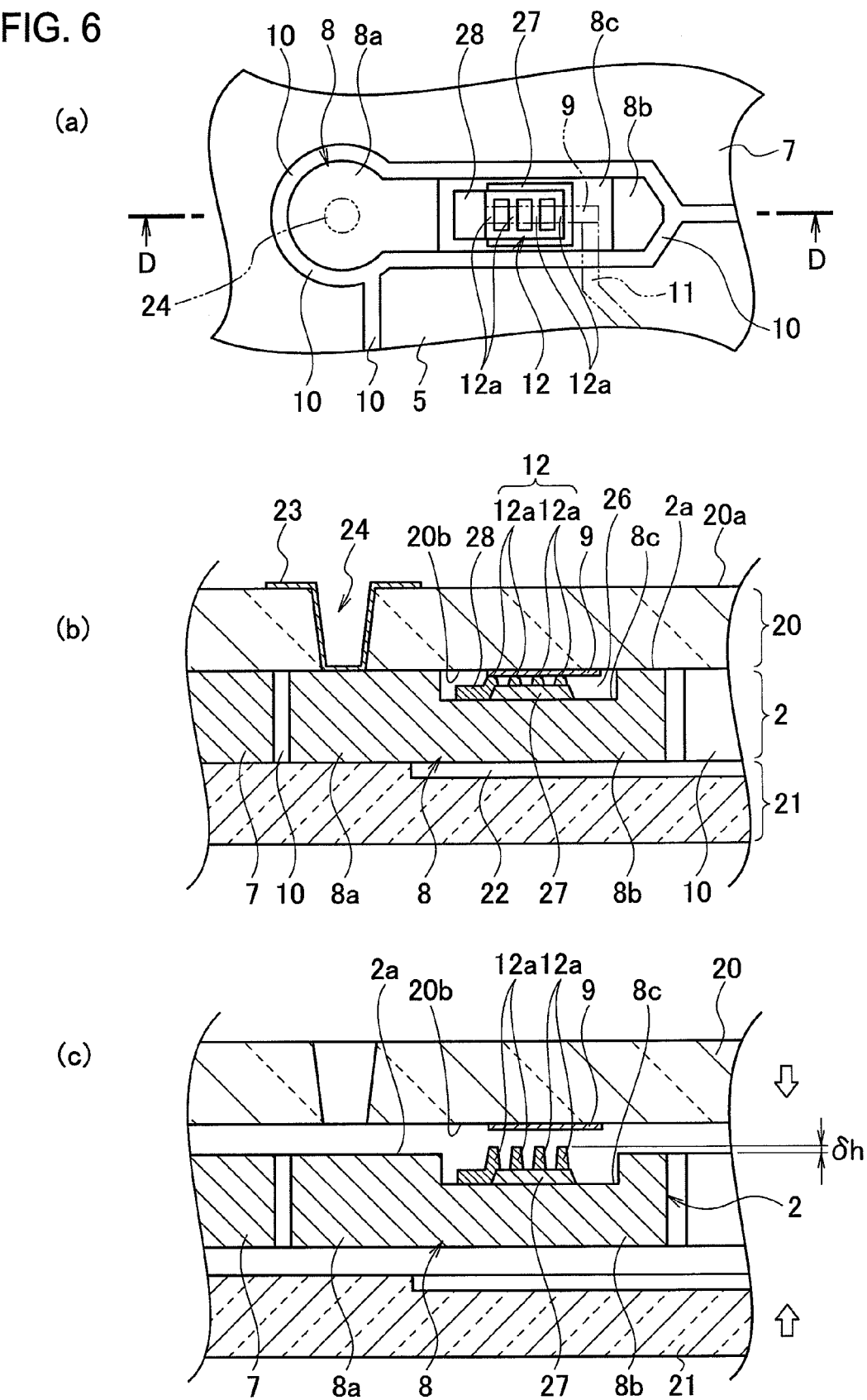
FIG. 6 are enlarged diagrams of a potential taking-out portion as a portion of a semiconductor layer of the capacitive sensor according to the embodiment of the present invention, where (a) is a plan view, (b) is a sectional view taken along the line D-D in (a), and (c) shows a state before assembling.

Meanwhile, in the potential taking-out portion 8 explained using FIG. 6, the recess 26 having the flat bottom surface 8C formed by notching the pedestal 8b is formed by crystal anisotropy etching when the recess 22 is formed. In the potential taking-out portion 8 that takes out the potential of the fixed electrode 6, it is necessary that the recess 26 is formed precisely to secure reliable contact and conduction between the terminal 9 and the contact portion 12. Therefore, if the recess 26 is formed by the crystal anisotropy etching when the recess 22 is formed by the crystal anisotropy etching, it is possible to precisely form the recess 26 with small variation.

Figure 12:
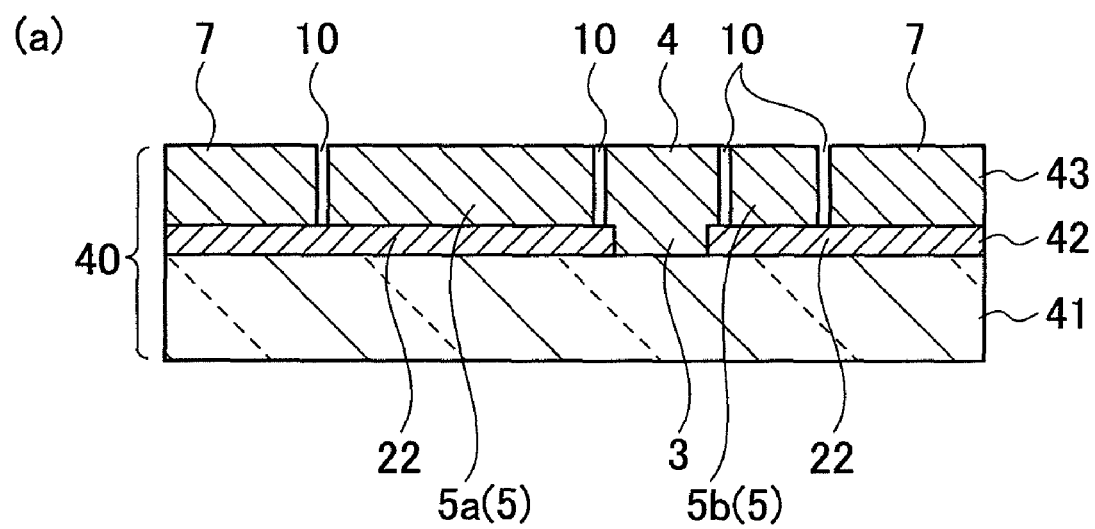
FIG. 12 are explanatory diagrams of formation of the capacitive sensor using an SOI (silicon on insulator) substrate.
Figure 12:
Figure 12:
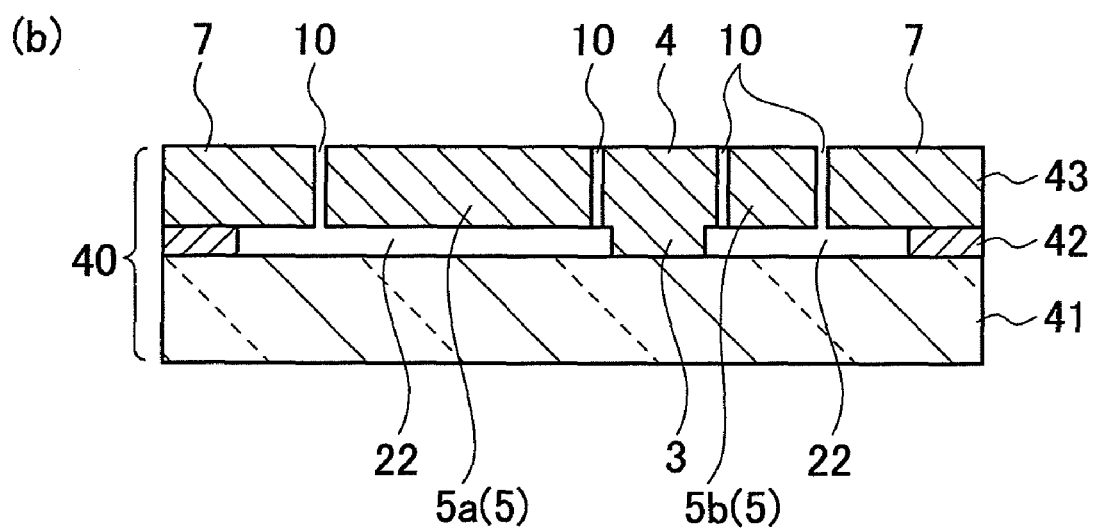

The anchor portion 3, the beam portion 4 and the movable electrode 5 of the sensor 1 can be formed of SOI (Silicon On Insulator) of a double structure in which SIO is inserted as an intermediate oxide film 42 between a silicon support substrate 41 and a silicon active layer 43. FIG. 12 are sectional views corresponding to B-B cross section in FIG. 9.

When the SOI substrate 40 is used, the gap 10 is first formed as shown in FIG. 12(a) by the vertical etching working, the intermediate oxide film 42 is removed by sacrificial layer etching as shown in FIG. 12(b), thereby forming the recess 22. That is, the silicon active layer 43 corresponds to the semiconductor layer 2. When the SOI substrate 40 is used, since one step for bonding the semiconductor layer 2 to another substrate can be omitted, there is a merit that the capacitive sensor can be easily formed.

Meanwhile, since the recess 22 is formed by the sacrificial layer etching, when the semiconductor layer 2 is formed by the single crystal silicon substrate, the possibility that the amount of etching residue is increased is high as compared with a case that the recess 22 is previously formed by etching before it is bonded to the insulation layer 20 such as a glass substrate. Further, since the insulation layer 20 cannot be a glass substrate, the above effect cannot be obtained.

Since the beam portion 4 includes a cross section (cross section perpendicular to the extending axis of the beam portion 4) which is long in the thickness direction of the sensor 1, the beam portion 4 is not easily bent. The beam portion 4 is a beam having a constant rectangular (substantially rectangular) cross section as shown in FIG. 4, and it is necessary that the thickness of the beam portion 4 along the thickness direction of the semiconductor layer 2 is 10 μm or more. The lower limit value 10 μm of the thickness h is calculated based on 3 μm or more, which is a distance between general detection gaps of the above-described detection gaps. When the distance between the detection gaps is set to 3 μm or more, it is necessary to displace the movable electrode 5 by a predetermined displacement amount to secure the sensitivity based on ability of a signal processing circuit that signal-processes a value detected by the sensor 1.

Hence, the thickness of the movable electrode 5, i.e., the thickness of the beam portion 4 is set to 10 μm or more, which is about three times of 3 μm that is the minimum distance between the detection gaps. With this configuration, it is possible to secure a mass for displacing the movable electrode 5 by an enough distance for obtaining the necessary sensitivity. The upper limit of the thickness of the movable electrode 5, i.e., the thickness of the beam portion 4 can be set to 500 μm according to the thickness of the single crystal silicon substrate that forms the semiconductor layer 2.

Figure 13:
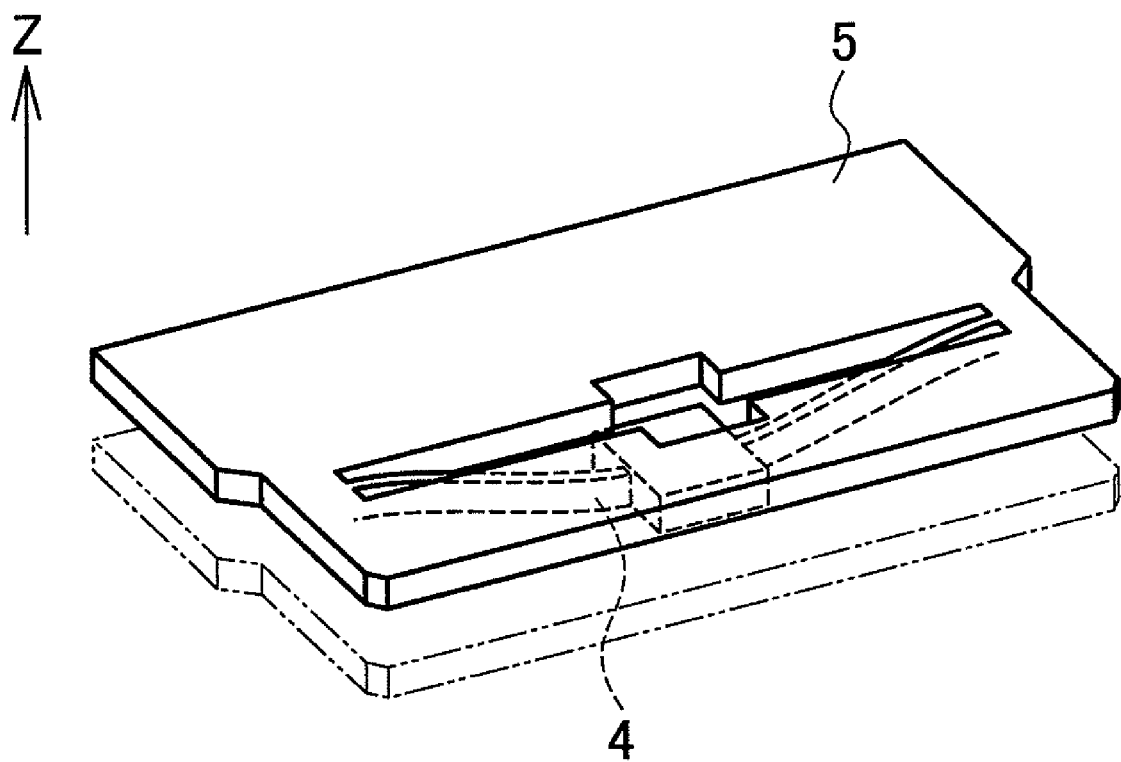
FIG. 13 shows a movable electrode of the capacitive sensor is displaced in position to a vertical direction without twisting.

The thickness h of the beam portion 4 shown in FIG. 4 is 3.16 times or more of the width W of the beam portion 4. For example, when the movable electrode 5 is normally displaced by twisting the beam portion 4 according to vertical acceleration, even if the movable electrode 5 comes into contact with the insulation layers 20 and 21, the contact manner is line-contact or point-contact. However, when excessive acceleration is added, the movable electrode 5 is displaced in the Z-axis direction while keeping the surface horizontally and the movable electrode 5 comes into surface-contact with the insulation layers 20 and 21 as shown in FIG. 13, and there is a possibility that sticking occurs. To prevent the movable electrode 5 from displacing in the Z-axis direction, i.e., in the vertical direction, it is necessary to reduce a mode in which it is not twisted and lifted as it is.

More specifically, if the bending of the beam portion 4 in the vertical direction is set to 1/10 or less of the bending of the beam portion 4 in the horizontal direction, it is possible to largely reduce the mode in which the beam portion 4 is not twisted and lifted as it is. Hence, the maximum bending based on the cross section secondary moment is calculated, and if the thickness h of the beam portion 4 is determined such that the bending of the beam portion 4 in the vertical direction becomes 1/10 or less of the bending of the beam portion 4 in the horizontal direction, it is necessary that the thickness h of the beam portion 4 is 3.16 ($\approx 10^{1/2}$) times or more of the width w of the beam portion 4.

With this configuration, it is possible to largely reduce the mode in which the movable electrode 5 is not twisted and lifted as it is. Therefore, the movable electrode 5 comes into surface-contact with the insulation layers 20 and 21 and the movable electrode 5 can twist excellently around the beam portion 4 according to the physical value without causing the sticking.

Figure 14:
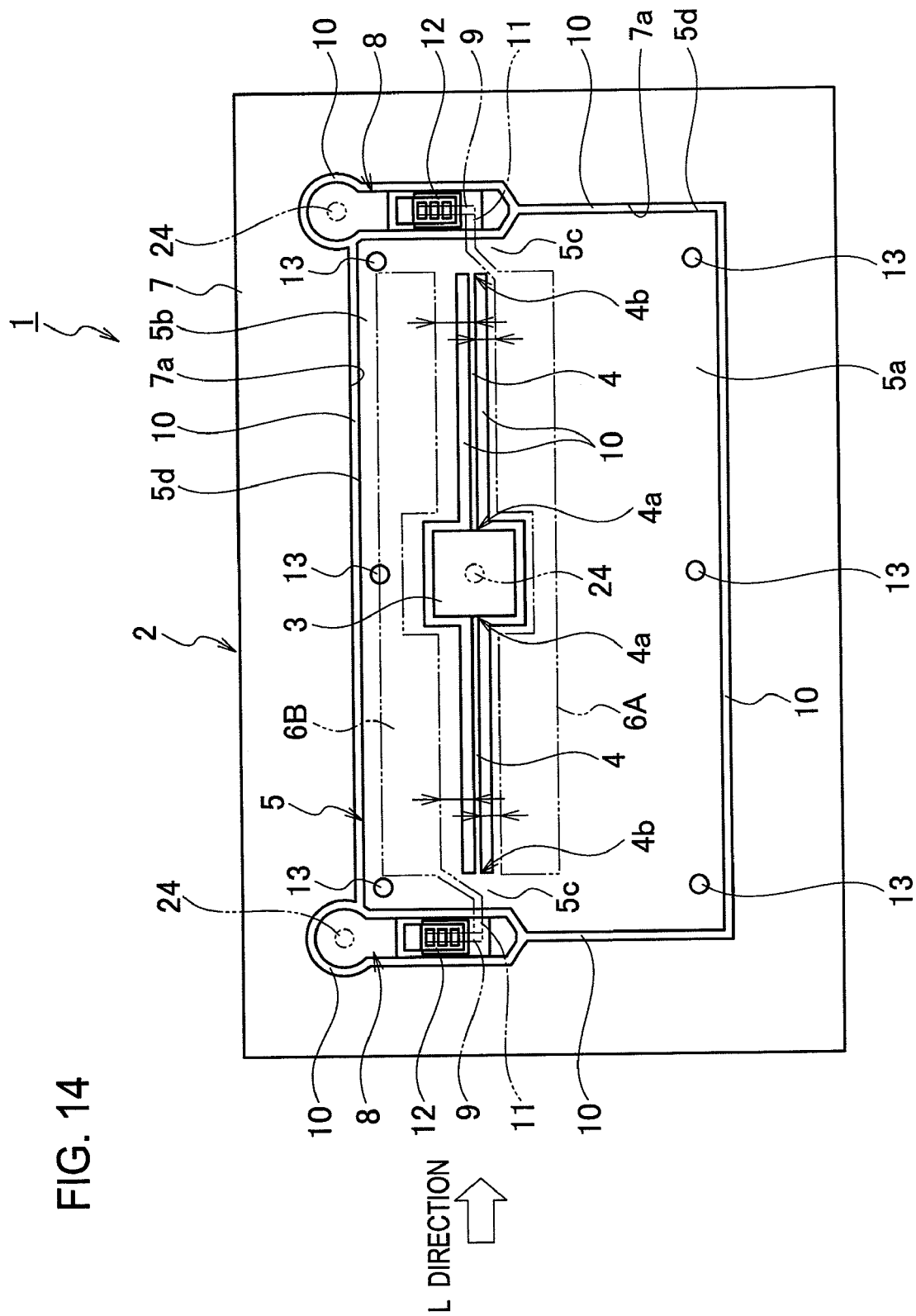
FIG. 14 is an explanatory diagram of an installation position of the fixed electrode of the capacitive sensor.

As shown in FIG. 14, the fixed electrodes 6A and 6B are not provided such that they are vertically symmetric with respect to the beam portion 4 (as symmetric axis) which is the center of the twisting motion of the movable electrode 5, but is provides such that the fixed electrodes 6A and 6B are deviated toward the small plate portion 5b of the movable electrode 5.

Figure 15:
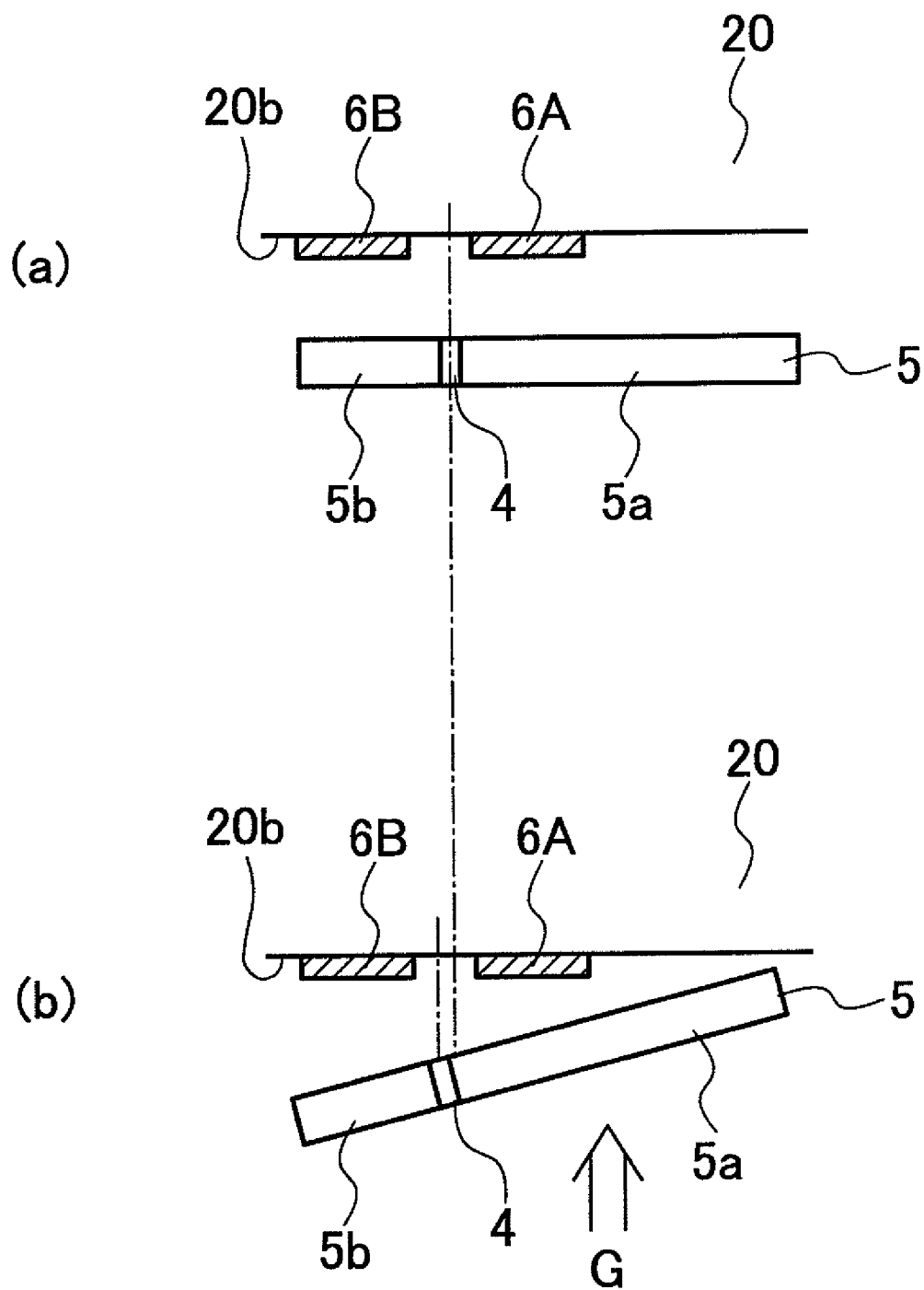
FIG. 15 show a state that the center of switching motion that moves the movable electrode of the capacitive sensor is deviated.

FIGS. 15(a) and (b) show a state that the center of the twisting motion is deviated before and after the acceleration G is added from below in the vertical direction when the sensor 1 is seen from the direction of the arrow L shown in FIG. 14. It is conceived that the phenomenon in which the twisting center is deviated is caused because the movable electrode 5 functioning as mass, i.e., the large plate portion 5a and the small plate portion 5b are formed asymmetric with respect to the beam portion 4 that is the center of the twisting motion.

The deviation amount of the twisting center is taken into account based on the state that the fixed electrodes 6A and 6B are symmetrically disposed with respect to the beam portion 4 as symmetric axis as a reference, and as shown in FIG. 15(a), the fixed electrode 6A and the fixed electrode 6B are provided on the lower surface 20b of the insulation layer 20 such that the fixed electrode 6A is in a direction approaching the beam portion 4 and the fixed electrode 6B is in a direction separating away from the beam portion 4. At that time, the deviation amounts of the fixed electrodes 6A and 6B, i.e., installation positions of the fixed electrodes 6A and 6B on the lower surface 20b of the insulation layer 20 are determined according to a detection range of acceleration that is ensured by the sensor 1.

If the positions of the fixed electrodes 6A and 6B are determined according to the center position of the twisting motion of the movable electrode 5 that is varied when the physical value is added, since the linearity of capacitance detected according to the added physical value is enhanced, it is possible to detect the physical value precisely.

Further, if the opposing area between the fixed electrode 6 and the movable electrode 5 provided on the insulation layer 20 is increased, the detection sensitivity of the physical value to be detected by the sensor 1 can be enhanced. Therefore, it is not formed into the paper tablet shape extending along long sides of the large plate portion 5a and the small plate portion 5b of the movable electrode 5 as shown in FIG. 16(a), but the fixed electrodes 6A and 6B are formed on the lower surface 20b of the insulation layer 20 opposed to the large plate portion 5a and the small plate portion 5b along the shape of the gap 10 while avoiding the gap 10 provided for forming the anchor portion 3 and the beam portion 4, thereby increasing the opposing area. With this configuration, since the opposing area with respect to the movable electrode 5 defined by the fixed electrodes 6A and 6B can be secured to the utmost, it is possible to detect the physical value added to the sensor 1 with remarkably excellent sensitivity.

As described above, the sensor 1 shown as the present embodiment forms the movable mechanism of the movable electrode 5 comprising the anchor portion 3, the beam portion 4 and the movable electrode 5 by vertically etching the semiconductor layer 2 which is the single crystal silicon substrate. Therefore, the movable electrode 5 can be formed using the sufficiently thick semiconductor layer 2.

With this configuration, since the mass of the movable electrode 5 can be sufficiently secured, the movable electrode 5 is largely displaced according to the physical value. Thus, the detection sensitivity of capacitance can be enhanced.

Since the displacement amount of the movable electrode 5 is large, a wide detection gap can be secured. Therefore, it is possible to prevent sticking from being generated between the movable electrode 5 and the insulation layer 20 where the fixed electrode 6 is provided.

Due to the vertical etching carried out by an etching device having an ICP, a working surface formed with the semiconductor layer 2 is not tapered, the device size can be reduced. Further, since the working surface is not tapered, even if the beam portion 4 and the movable electrode 5 come into contact with each other due to an excessive physical value, it is possible to prevent the structure from becoming chipped. Further, since the vertically etched surface is not a specular surface, even if it comes into contact, sticking is not generated.

When the vertical etching is carried out, since the cross section shape of the etched portion is substantially symmetric vertically, it is possible to prevent the sensitivity from being generated in the other axial direction with respect to the main axial direction which is the detection direction. Since the sensor 1 shown as the present embodiment has the semiconductor layer 2 as the single crystal silicon substrate having small film stress, easy working process can be realized.

Third Embodiment

Next, a structure of the sensor 1 shown as a third embodiment of the present invention will be explained with reference to FIGS. 17 and 18. The sensor 1 shown as the third embodiment is identical to the sensor 1 shown as the second embodiment that detects a physical value in the vertical direction which is the thickness direction of the semiconductor layer 2, except that the sensor 1 shown as the third embodiment can detect a physical value in the horizontal direction which is a plane direction of the semiconductor layer 2.

Figure 17:
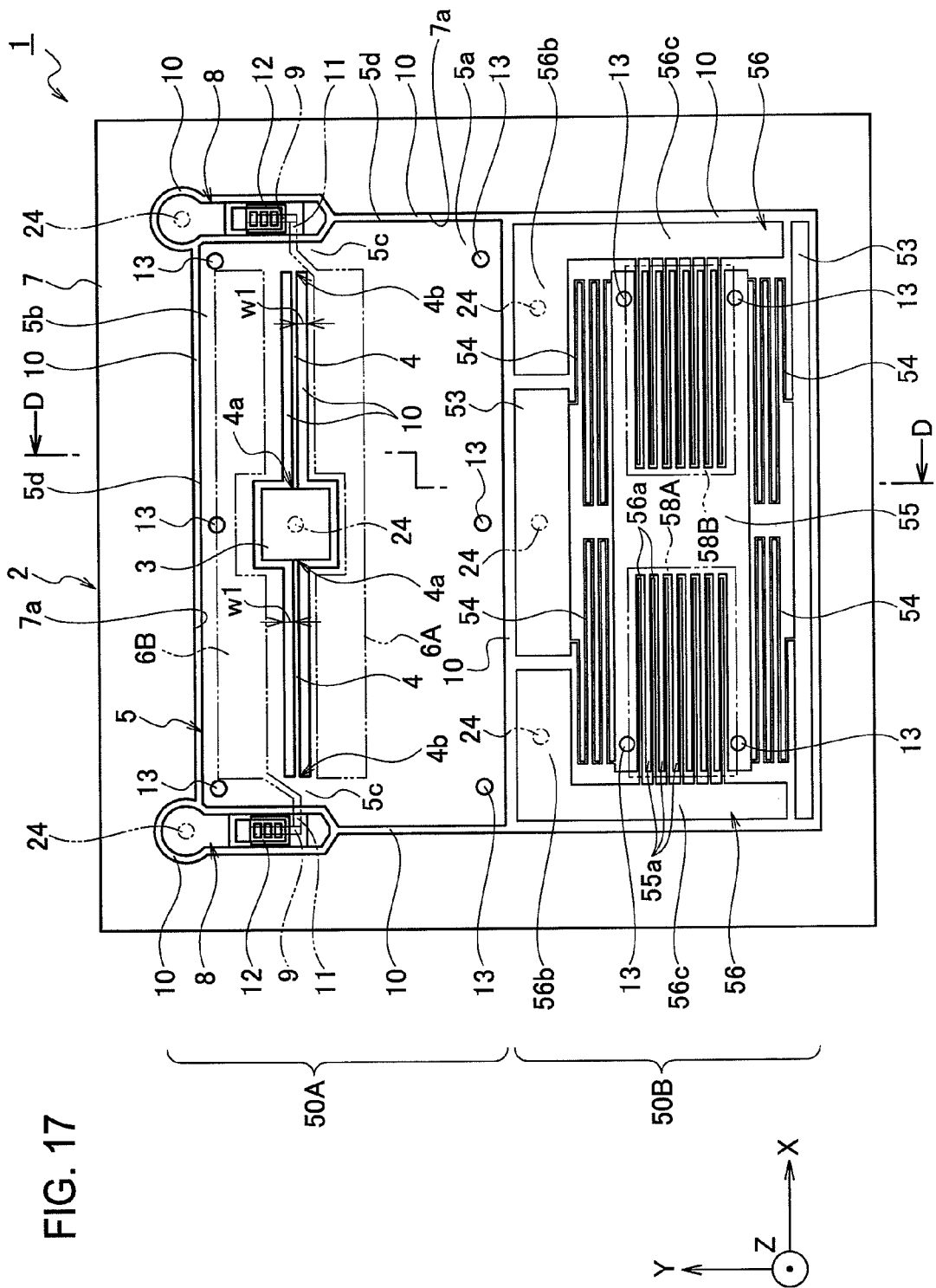
FIG. 17 is an explanatory diagram of a structure of a semiconductor layer of a capacitive sensor as a second embodiment of the present invention.

FIG. 17 is a plan view showing the semiconductor layer 2 of the sensor 1. As shown in FIG. 17, the semiconductor layer 2 includes a vertical direction detecting unit 50A that detects a physical value in the vertical direction by forming a gap 10 in the semiconductor substrate by a known process, a horizontal direction detecting unit 50B that detects a physical value in the horizontal direction, and a frame portion 7 surrounding these units. Since the vertical direction detecting unit 50A is just the same as the sensor 1, it will be described appropriately if necessary and detailed explanation thereof will be omitted.

The gap 10 is formed such that the sidewall surface of the gap 10 is perpendicular to the surface of the semiconductor layer 2 by vertically etching the gap 10 by reactive ion etching like the gap 10 of the sensor 1 shown as the second embodiment. The sidewall surfaces of the gap 10 formed by the vertical etching are opposed to each other substantially in parallel to each other. As the reactive ion etching, it is possible to utilize the ICP working by an etching device having inductively coupled plasma (ICP).

As shown in FIG. 17, the semiconductor layer 2 of the horizontal direction detecting unit 50B is formed with a support unit 53, a beam portion 54, a movable electrode 55 and a fixed electrode 56.

Figure 18:
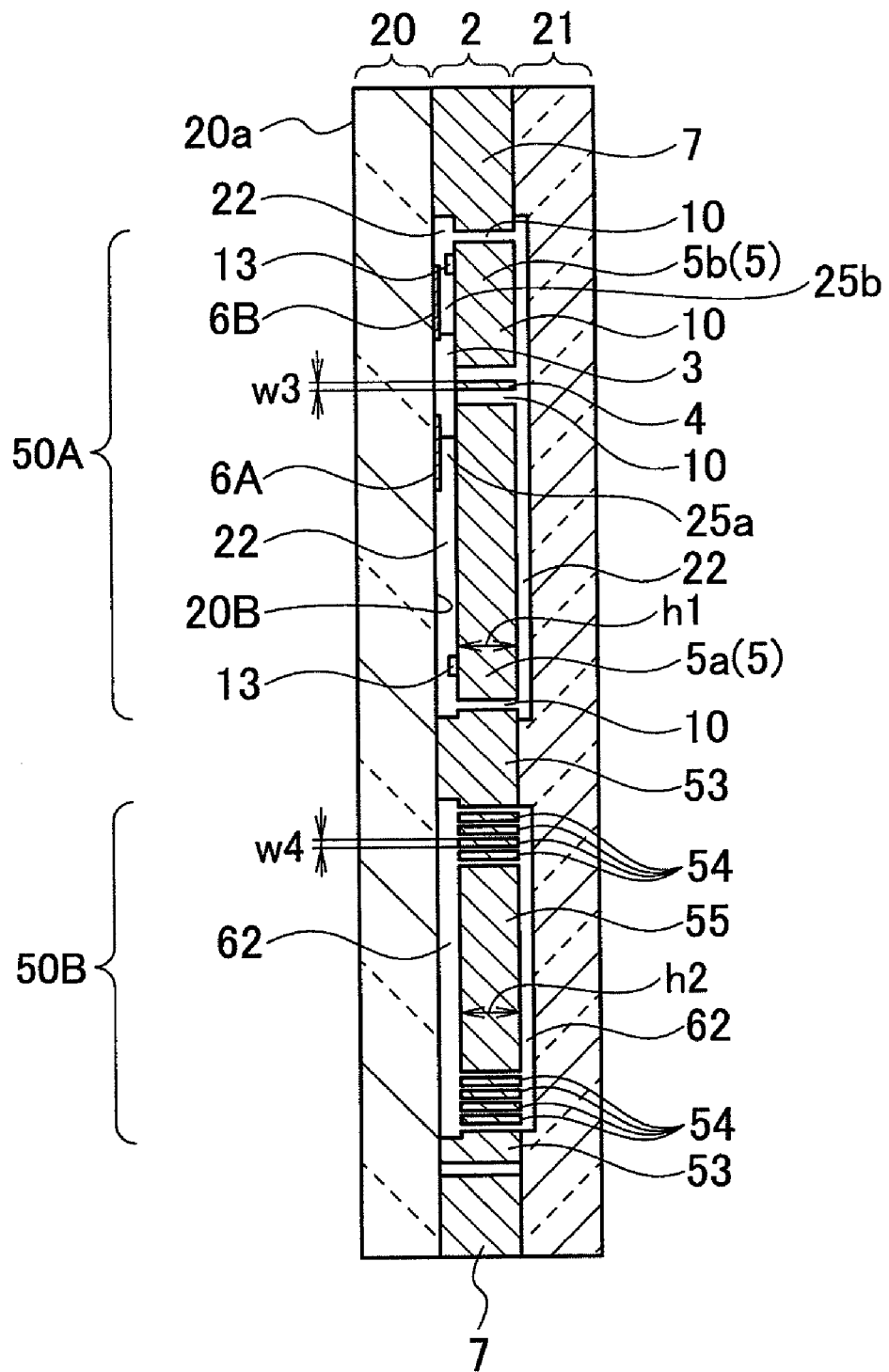
FIG. 18 is a sectional view for explaining a state that the capacitive sensor is cut along the line D-D shown in FIG. 14.

FIG. 18 is a sectional view showing a state that the sensor 1 is cut such as to cut the semiconductor layer 2 along the line D-D in FIG. 17. As shown in FIG. 18, the sensor 1 is formed by bonding insulation layers 20 and 21 such as glass substrates to both front and back surfaces of the semiconductor layer 2 by anodic bonding. Relatively shallow recesses 62 are formed in bonded surfaces between the semiconductor layer 2 and the insulation layers 20 and 21, insulation properties of the semiconductor layer 2 and moving easiness of the movable electrode 55 are secured. In the second embodiment of the present invention, for the bonded surface between the semiconductor layer 2 of the horizontal direction detecting unit 50B and the insulation layer 20, the recess 62 is provided on the side of the semiconductor layer 2, and for the bonded surface between the semiconductor layer 2 of the horizontal direction detecting unit 50B and the insulation layer 21, the recess 62 is provided on the side of the insulation layer 21.

As shown in FIG. 17, a pair of support units 53 are provided, one each, on the side of the long sides of the movable electrode 55 through the movable electrode 55, and the support unit 53 extends with a substantially constant width along the long side of the movable electrode 55. One of the pair of support units 53 provided in this manner is thinner and longer than the other one.

Each support unit 53 is provided with two beam portions 54. The beam portions 54 extend in parallel to the long side of the support unit 53, and intermediate portions of the beam portions 54 are folded and extended toward the center such as to meander. As shown in FIG. 17, the other end of the beam portion 4 is connected to a corner of the movable electrode 55, and functions as a spring element that movably supports the movable electrode 55 elastically with respect to the support unit 53.

With this configuration, the horizontal direction detecting unit 50B provides a function as a mass element supported by the support unit 53 connected to the beam portion 54 as the spring element with respect to the movable electrode 55. These spring element and mass element constitute a spring-mass system. The horizontal direction detecting unit 50B detects variation in capacitance between the movable electrode 55 and the fixed electrode 56 by positional displacement of the movable electrode 55 as the mass element. The horizontal direction detecting unit 50B can detect acceleration added to the sensor 1 from the voltage waveform obtained by C-V converting variation of the detected capacitance.

More specifically, the variation in capacitance is detected by detecting units 58A and 58B (when they are collectively called, they are called detecting unit 58) comprising a plurality of comb detection movable electrodes 55a and detection fixed electrodes 56a which are formed on the movable electrode 55 and the fixed electrode 56.

If acceleration is given in the Y-axis direction shown in FIG. 17, the movable electrode 5 is displaced in the Y-axis direction, and a difference is produced between a capacitance detected by the detection movable electrode 55a and the detection fixed electrode 56a of the detecting unit 58A and a capacitance detected by the detection movable electrode 55a and the detection fixed electrode 56a of the detecting unit 58B. Acceleration in the Y-axis direction can be detected from the capacitance difference.

The through hole 24 is sandblasted and formed in the corner 56b of the fixed electrode 56 shown in FIG. 17. The through hole 24 penetrates the insulation layer 20. A metal thin film and the like are formed from the semiconductor layer 2 exposed through the through hole 24, the inner peripheral surface of the through hole 24 and the surface 20a of the insulation layer 20 so that potential of the fixed electrode 56 can be taken out on the insulation layer 20. It is preferable that the surface of the insulation layer 20 is coated (molded) with resin layer (not shown).

The potential of the movable electrode 55 is taken out from the support unit 53 that supports the movable electrode 55 through the beam portion 54. The support unit 53 disposed on the upper side of the movable electrode 55 shown in FIG. 17 is sandblasted and formed with a through hole such as to penetrate the insulation layer 20. A metal thin film and the like are formed from the semiconductor layer 2 exposed through the through hole 24, the inner peripheral surface of the through hole 24 and the surface 20a of the insulation layer 20 so that potential of the movable electrode 55 can be taken out on the insulation layer 20.

Next, a detailed structure of the detecting unit 58 will be explained based on the detecting unit 58 of the horizontal direction detecting unit 50B shown in FIG. 19 using the enlarged plan view of the movable electrode 55 and the fixed electrode 56.

Figure 19:
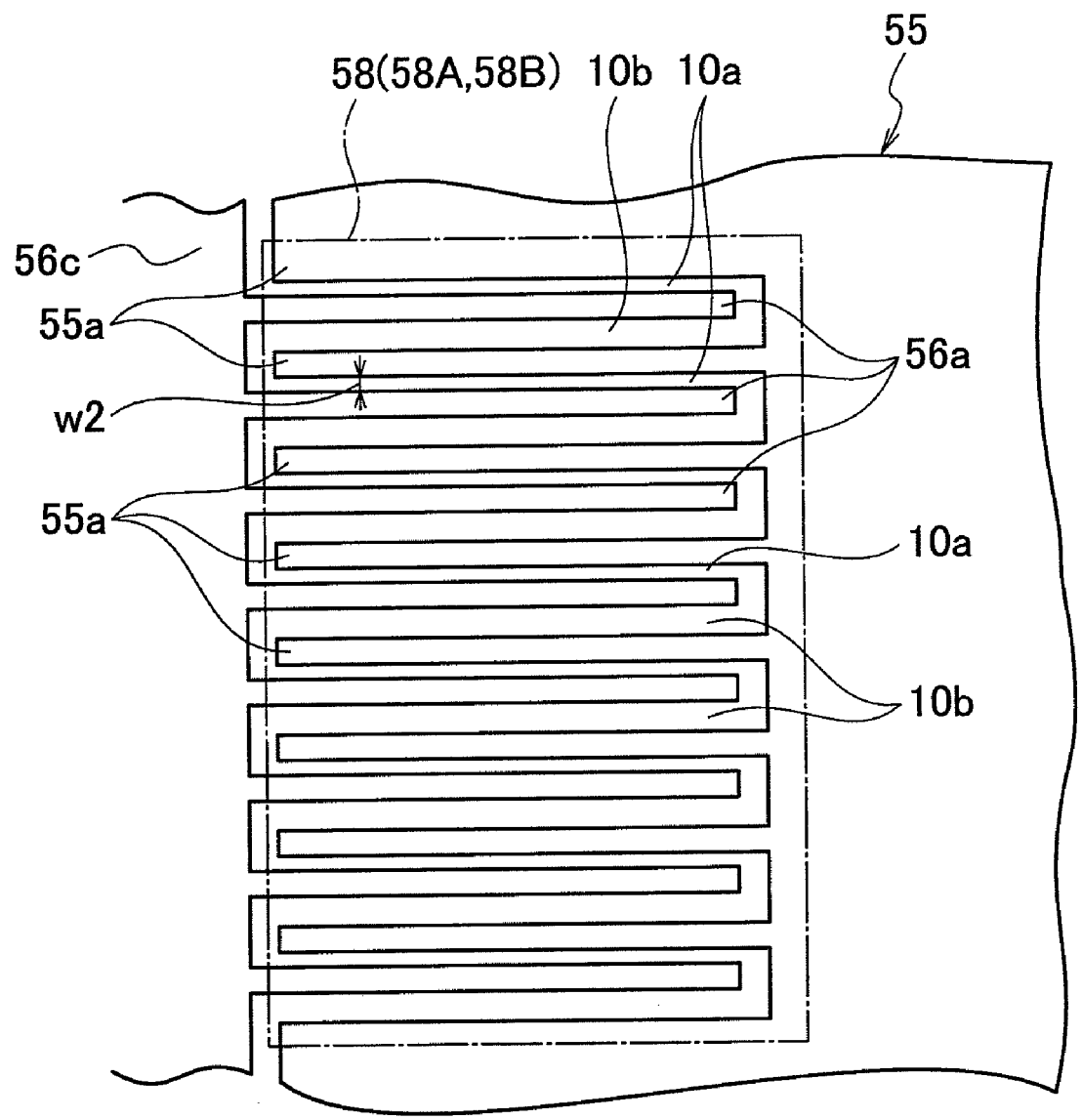
FIG. 19 is an explanatory diagram of a detailed structure of a detecting unit of a horizontal direction detecting unit of the capacitive sensor.

As shown in FIG. 19, the movable electrode 55 is formed with the band-like thin and long detection movable electrodes 55a that extends substantially perpendicularly to the side toward from the central portion of the movable electrode 55 toward the electrode support unit 56C of the fixed electrode 56. The movable electrodes 55a are formed in parallel to each other with a predetermined pitch in a form of a comb. The detection movable electrodes 55a are arranged such that tip ends thereof are in parallel to each other and the tip ends have the same lengths.

The fixed electrode 56 is formed with a plurality of band-like thin and long detection fixed electrodes 56a extending in parallel to the detection movable electrodes 55a from the electrode support unit 56C toward the central portion of the movable electrode 55. The detection fixed electrodes 56a are formed in a form of a comb at a predetermined pitch (the same pitch as that of the detection movable electrodes 55a for example) so as to be opposed to the detection movable electrodes 55a in a one-to-one relation in parallel to each other. The detection fixed electrodes 56a are arranged such as to correspond to the detection movable electrodes 55a such that they have the same lengths so that opposing areas of surfaces of the detection movable electrodes 55a and the detection fixed electrodes 56a opposing to each other can be secured as wide as possible.

As shown in FIG. 19, the gap 10 provided for forming the detection movable electrode 55a and the detection fixed electrode 56a has one narrow side gap 10a and the other wide side gap 10b. The detecting unit 58 detects a capacitance between the detection movable electrode 55a and the detection fixed electrode 56a in which the narrow side gap 10a is a detection gaps (electrode gap).

As shown in FIG. 17, a stopper 13 that is just the same as that provided on the movable electrode 5 of the vertical direction detecting unit 50A is provided at an appropriate position on the surface of the movable electrode 55, and this avoid a case that the movable electrode 55 comes into direct contact with (collides against) the insulation layer 20 and the insulation layer 20 is damaged. If the stopper 13 is made of the same material as that of the mat layer 27 of the potential taking-out portion 8 in the same producing step, the producing labor and producing cost can be reduced as compared with a case that they are formed separately.

As explained using FIG. 17, in the horizontal direction detecting unit 50B, the bonded surfaces between the semiconductor layer 2 and the insulation layer 20 are provided with the recess 42 on the side of the semiconductor layer 2. The recess 42 bonds the semiconductor layer 2 to the insulation layer 20, and before the gap 10 is formed, the recess 42 is formed by various etching processes such as wet etching and dry etching. After a recess 52 is formed by cutting the semiconductor layer 2 by the etching process in this manner, the insulation layer 20 which is the glass substrate is bonded, it is vertically etched, thereby forming the gap 10.

At this time, as shown in FIG. 18, the thickness h1 of the semiconductor layer 2 formed with the anchor portion 3, the beam portion 4 and the movable electrode 5 of the vertical direction detecting unit 50A, and the thickness h2 of the semiconductor layer 2 formed with the beam portion 54, the movable electrode 55 and the fixed electrode 56 of the horizontal direction detecting unit 50B are the same. If the thickness h1 and the thickness h2 are the same, the step for forming the recess 62 and the step for forming the recess 22 that defines the detection gaps in the vertical direction detecting unit 50A can be formed in the same step. If the thickness h1 and the thickness h2 are the same, the penetrating etching amount can be held constantly during the vertical etching working when the gap 10 is formed. Therefore, the etching time becomes the same and it is possible to prevent the over etching.

Figure 16:
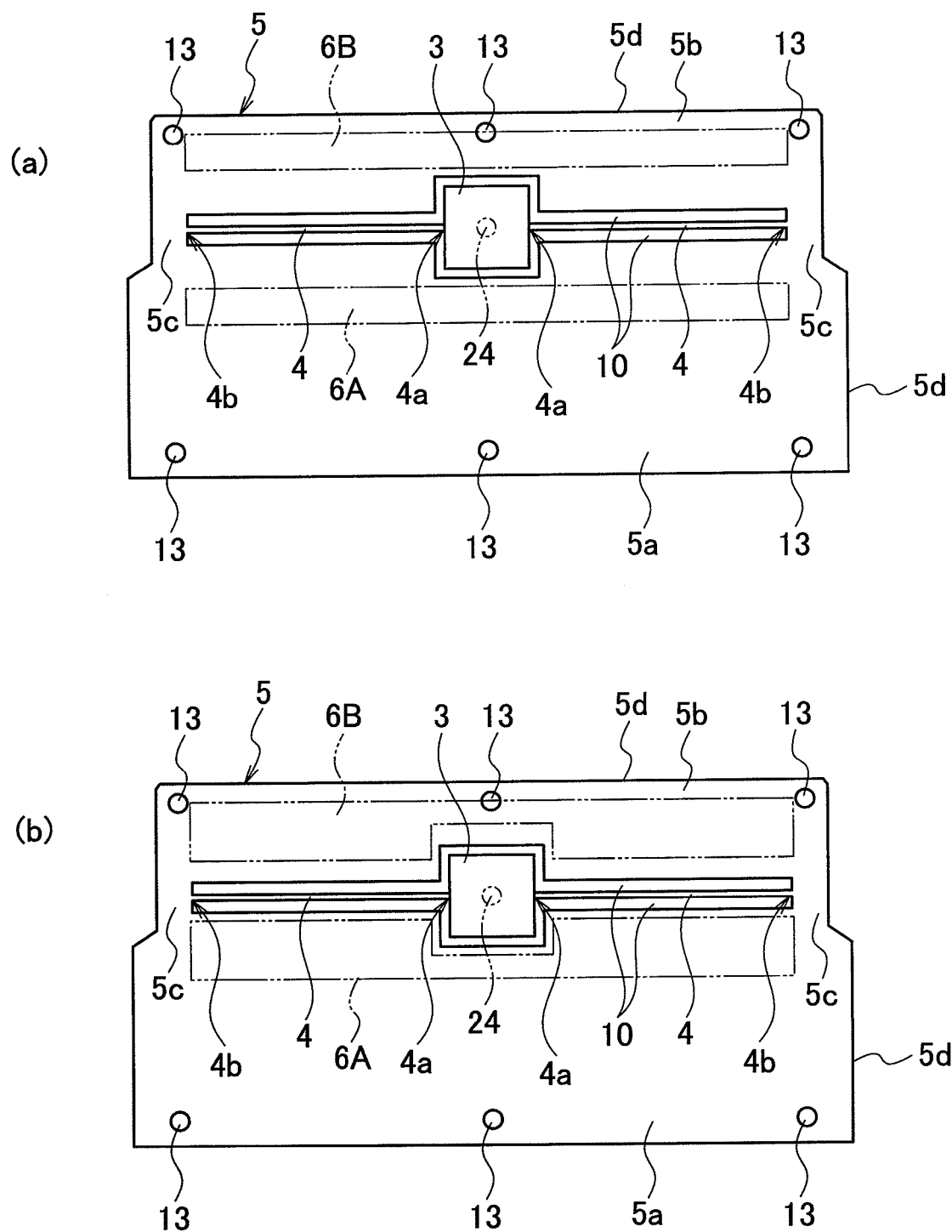
FIG. 16 are explanatory diagrams of a shape of the fixed electrode of the capacitive sensor.

The width w1 of the gap 10 through which it penetrate to form the beam portion 4 of the vertical direction detecting unit 50A shown in FIG. 17 and the width W2 of the gap 10a which is the detection gaps of the detecting unit 58 of the horizontal direction detecting unit 50B shown in FIG. 16 are the same. If the width w1 of the gap 10 and the width w2 of the gap 10a are the same, the etching speed at the time of the vertical etching working can be uniformized. Therefore, it is possible to largely suppress the variation in shapes of various portions formed after the etching processing by the vertical etching working.

Particularly, since the beam portion 4 of the vertical direction detecting unit 50A causes the twisting motion, the variation in width of the beam portion 4 affects the detection sensitivity. If the width w1 of the gap 10 and the width w2 of the gap 10a are the same and the variation in shape is reduced, the detection sensitivity of the vertical direction detecting unit 50A can be enhanced.

Further, the width w3 of the beam portion 4 of the vertical direction detecting unit 50A shown in FIG. 18 and the width w4 of the beam portion 54 of the horizontal direction detecting unit 50B are set to the same value. If the width w3 of the beam portion 4 and the width w4 of the beam portion 54 are the same, it becomes easy to manage the over etching when the vertical etching is carried out. In addition, if the width w3 of the beam portion 4 and the width w4 of the beam portion 54 are the same, outward appearance inspection by the image recognition of the device carried out after the semiconductor process is completed becomes easy.

Figure 20:
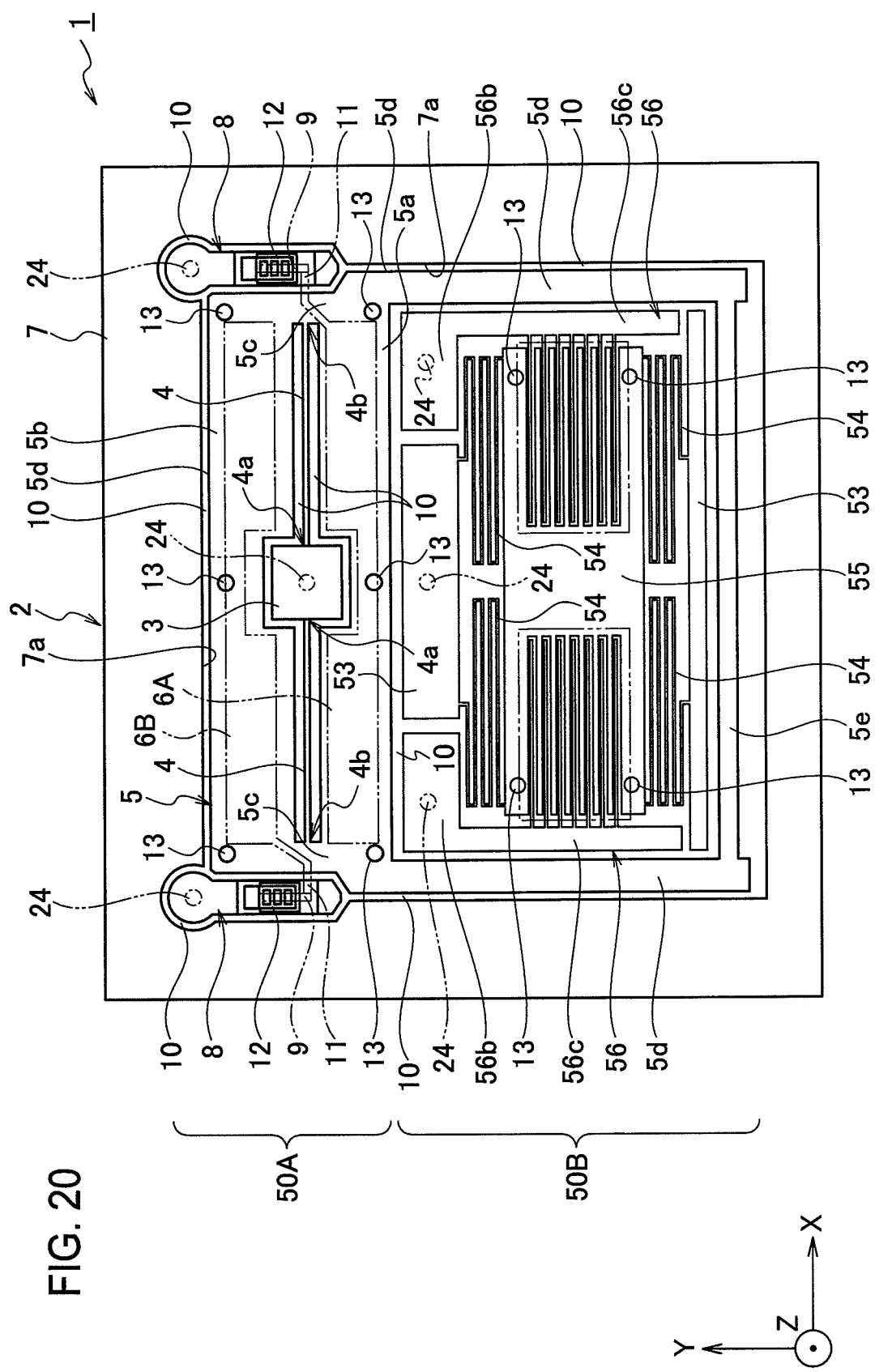
FIG. 20 is an explanatory diagram of another shape of the movable electrode of the capacitive sensor.

The sensor 1 shown as the third embodiment can have a structure as shown in FIG. 20. The sensor 1 shown in FIG. 20 has a movable electrode 5 of the vertical direction detecting unit 50A having a frame-like shape surrounding the horizontal direction detecting unit 50B. More specifically, the large plate portion 5a of the movable electrode 5 is downsized and a mass thereof is reduced, and the horizontal direction detecting unit 50B is surrounded by a connection 5e that connects two arm portions 5d and 5d extending in parallel to each other along the longitudinal direction of the electrode support unit 56C of the fixed electrode 56 of the horizontal direction detecting unit 50B from the downsized large plate portion 5a.

If the movable electrode 5 is formed such as to surround the horizontal direction detecting unit 50B, inertia moment can be obtained by the arm portion 5d and the connection 5e that are mass components far from the beam portion 4 that is the center of twisting motion. Therefore, even if the large plate portion 5a is downsized to reduce the mass, sufficient detection sensitivity can be enhanced, and the detection sensitivity can be enhanced. Further, since the vertical direction detecting unit 50A and the horizontal direction detecting unit 50B can be disposed efficiently, there is a merit that the sensor 1 can be made smaller.

According to the sensor 1 shown as the third embodiment of the present invention, the vertical direction detecting unit 50A that detects the physical value in the thickness direction of the semiconductor layer 2 and the horizontal direction detecting unit 50B that detects the physical value in the plane direction of the semiconductor layer 2 are formed by vertical etching the same semiconductor layer 2. For example, in the case of a sensor in which two sensors that detect physical values in one axial direction are disposed and a physical value in the other axial directions which are perpendicular to each other is detected, the right angle precision between two axes is deteriorated due to positional deviation and floatation at the time of actual mounting, however, according to the sensor 1 shown as the third embodiment of the present invention, since the right angle precision of the detection axes can be secured precisely, both the physical values can be detected precisely.

Further, the vertical direction detecting unit 50A and the horizontal direction detecting unit 50B can be formed by the same process, the producing process can be reduced, the production cost can also be reduced and the shape can be made smaller. Further, the thickness h1 of the semiconductor layer 2 formed with the anchor portion 3, the beam portion 4 and the movable electrode 5 of the vertical direction detecting unit 50A and the thickness h2 of the semiconductor layer 2 formed with the horizontal direction detecting unit 50B, the beam portion 54, the movable electrode 55 and the fixed electrode 56 of the horizontal direction detecting unit 50B are the same, if characteristics such as sensitivities of the vertical direction detecting unit 50A and the horizontal direction detecting unit 50B of the produced sensor 1 are varied, it can be determined that there is variation in single crystal silicon wafers themselves before the single crystal silicon substrates are cut out.

Accordingly, it is easy to grasp the characteristics such as producing variation of the single crystal silicon wafers from the performance of the produced sensor 1, and when an abnormal condition occurs in the producing process of the single crystal silicon wafers, it is possible to swiftly find the abnormal condition and to enhance the quality.

If the vertical direction detecting unit 50A and the horizontal direction detecting unit 50B are integrally formed together and thickness thereof is made constant, the total weight balance can be secured, and even if the sensor detects physical values in the vertical direction and horizontal direction, it is possible to largely reduce the floating of actual mounting and thus, the other axis sensitivity can be enhanced.

Note that the embodiments described above are only examples of the present invention. Therefore, the present invention is not limited to the embodiments, and can be carried out by embodiments other than the above embodiments while various changes can be made according to the design or the like, without departing from the technical scope of the invention.

INDUSTRIAL APPLICABILITY

The present invention can be applied to a capacitive sensor that detects a predetermined physical value by detecting a capacitance between a fixed electrode and a movable electrode.

The invention claimed is:
1. A capacitive sensor, comprising:
a first detector movably supported by a fixed portion of a semiconductor layer through a beam portion such that an asymmetric weight balance is kept, in which a first movable electrode that moves according to displacement of a physical value in a thickness direction of the semiconductor layer and a first fixed electrode formed on a support substrate that supports the semiconductor layer are opposed to each other with a gap interposed therebetween, the first detector detecting the physical value based on a capacitance detected according to a size of the first movable electrode and the first fixed electrode, the semiconductor layer being a single crystal silicon layer, a movable mechanism of the first movable electrode comprising the fixed portion, the beam portion and the first movable electrode being formed by vertically etching the single crystal silicon layer; and
a second detector having:
    a second movable electrode movably supported by the fixed portion of the semiconductor layer through a beam portion, and that is operated according to displacement of physical values in both directions of the semiconductor layer; and
    a second fixed electrode formed by the semiconductor layer, wherein the second movable electrode and the second fixed electrode are opposed to each other through a gap, the second detector detecting a physical value based on a capacitance detected according to a size of the gap between the second movable electrode and the second fixed electrode,
wherein the first movable electrode of the first detector has a shape surrounding the second detector.

* * * * *